Feb. 6, 1923.

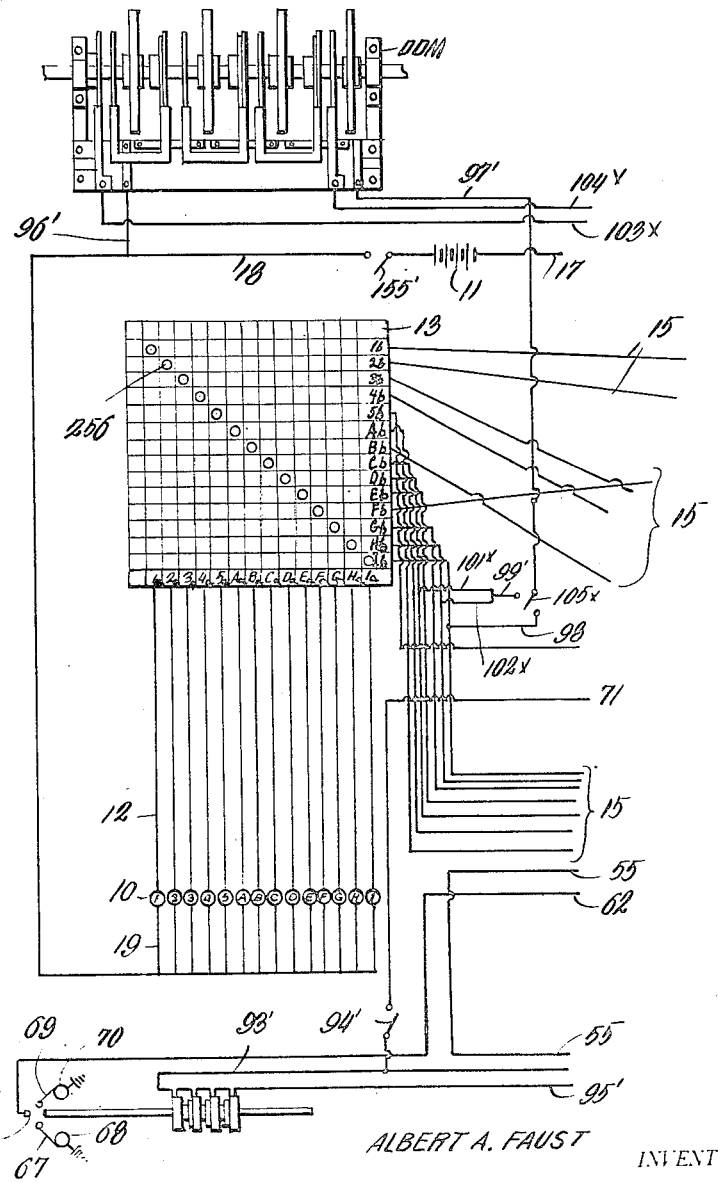

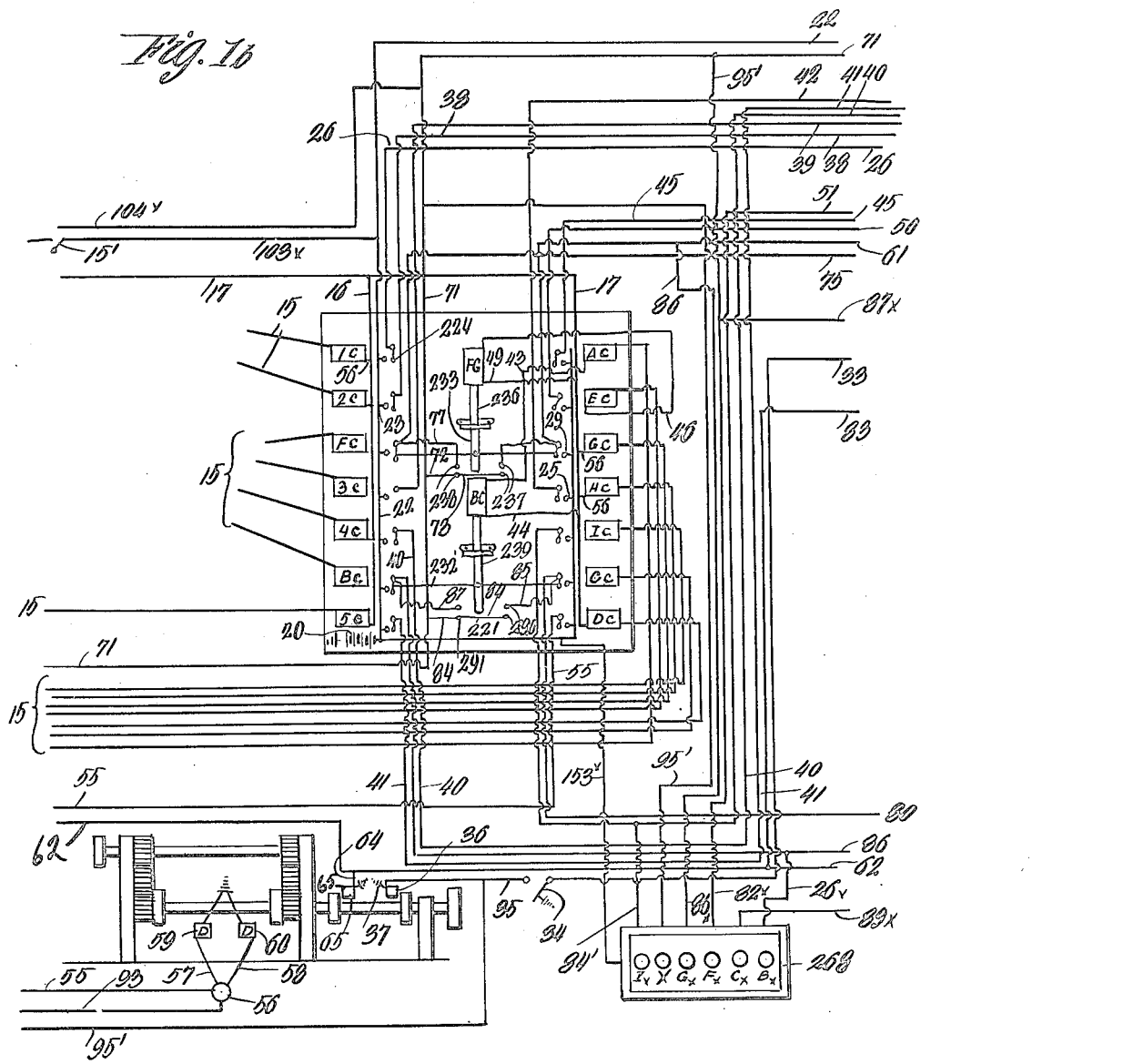

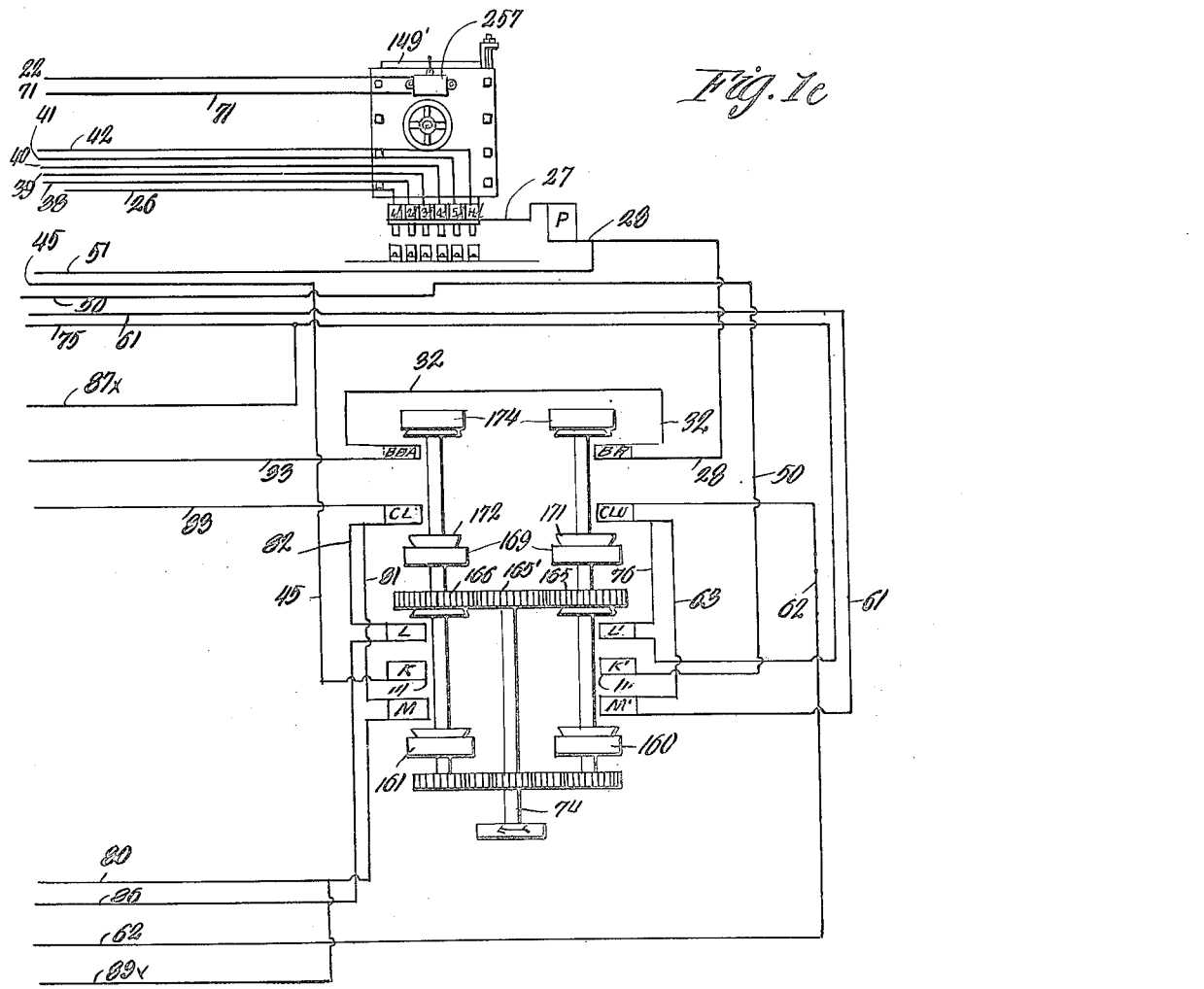

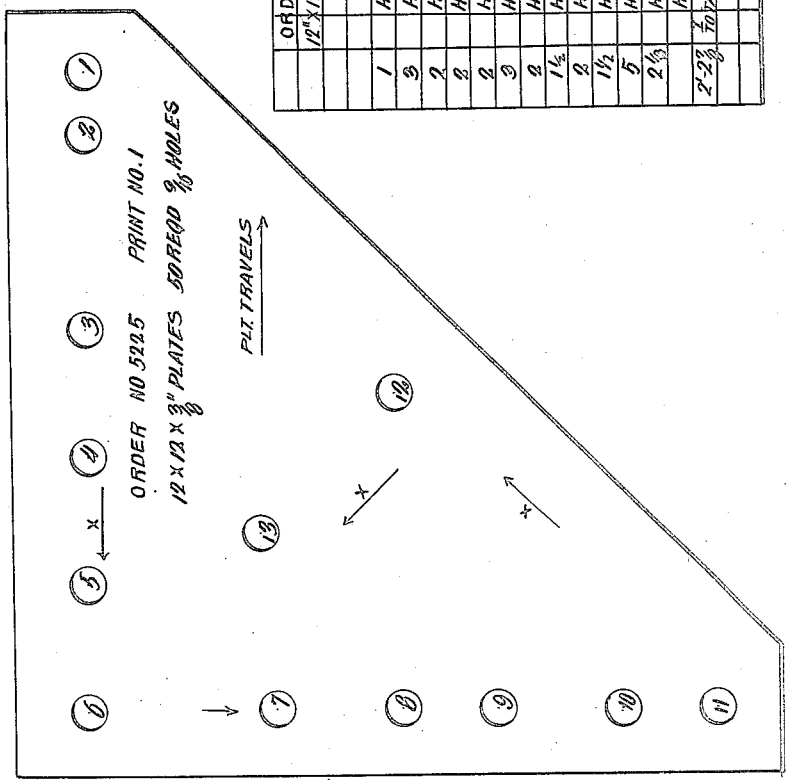

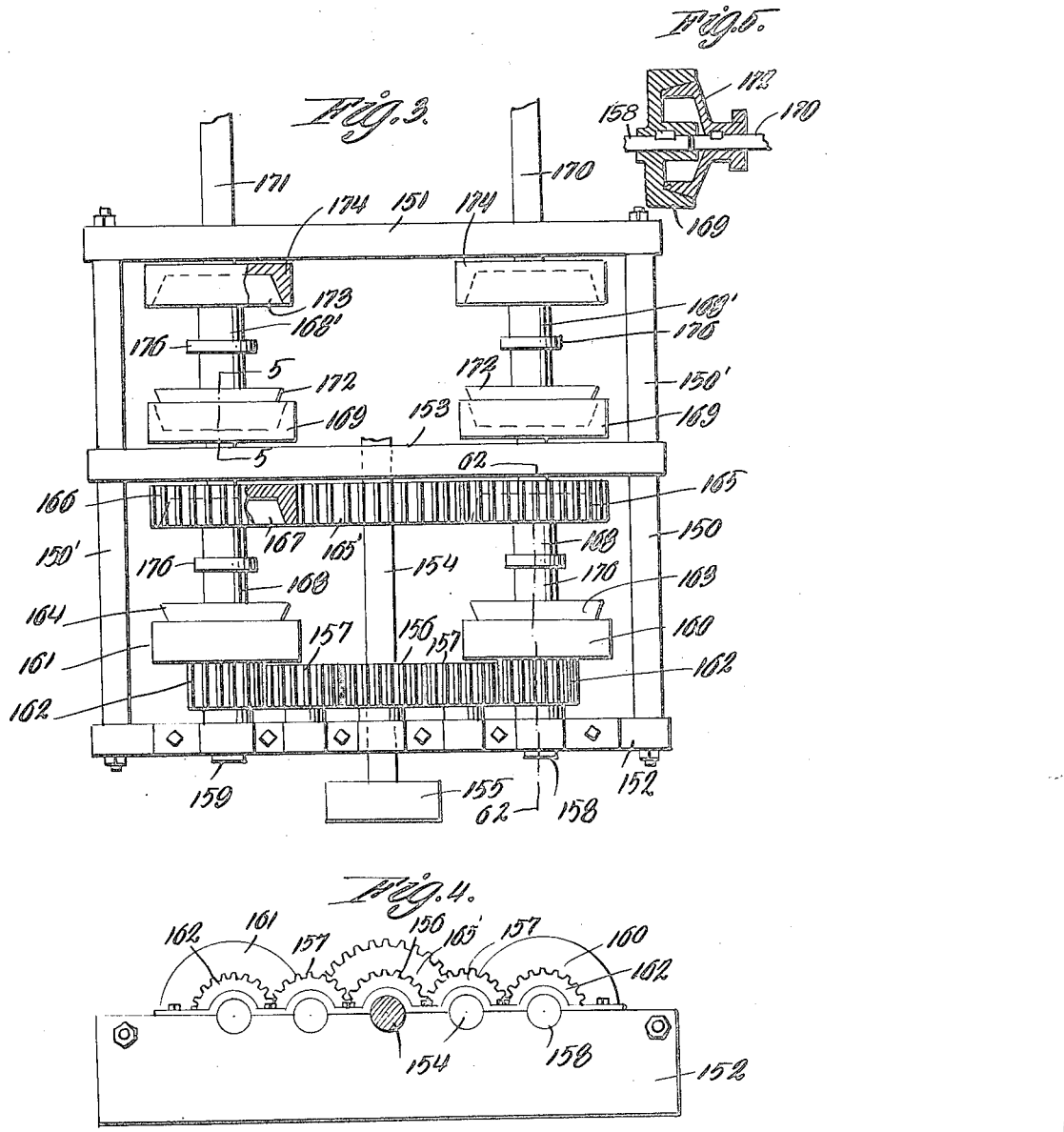

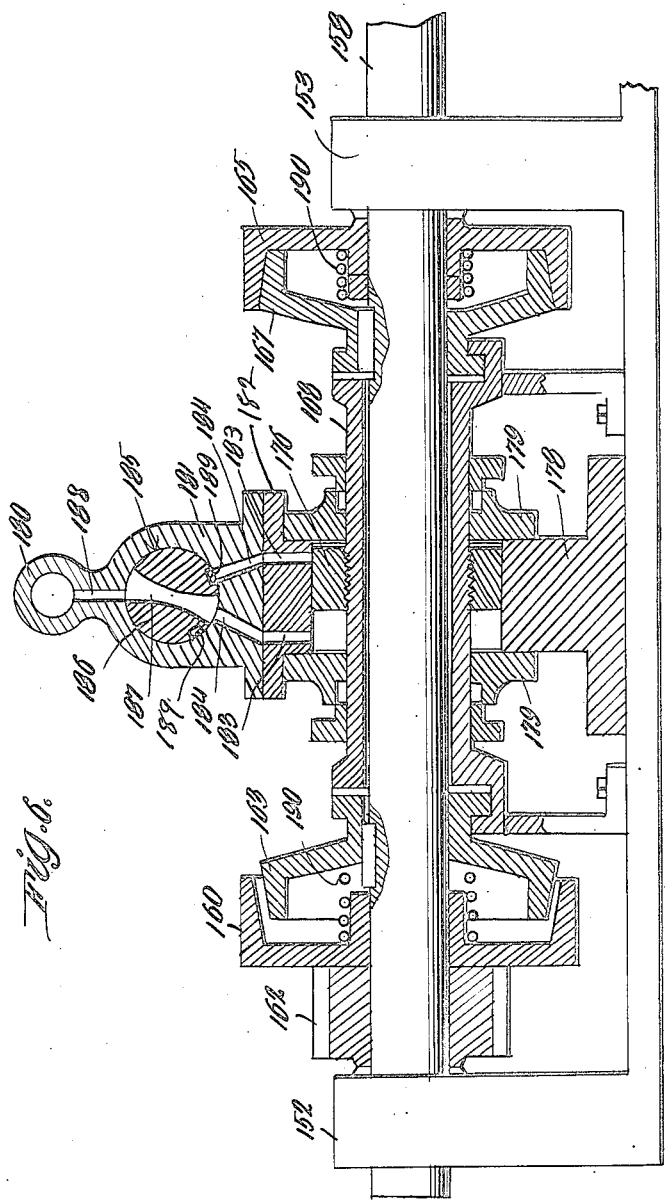

A. A. FAUST.
SPACING APPLIANCE.
FILED AUG. 11, 1921.

WITNESSES

ALBERT A. FAUST, INVENTOR.

BY

ATTORNEY.

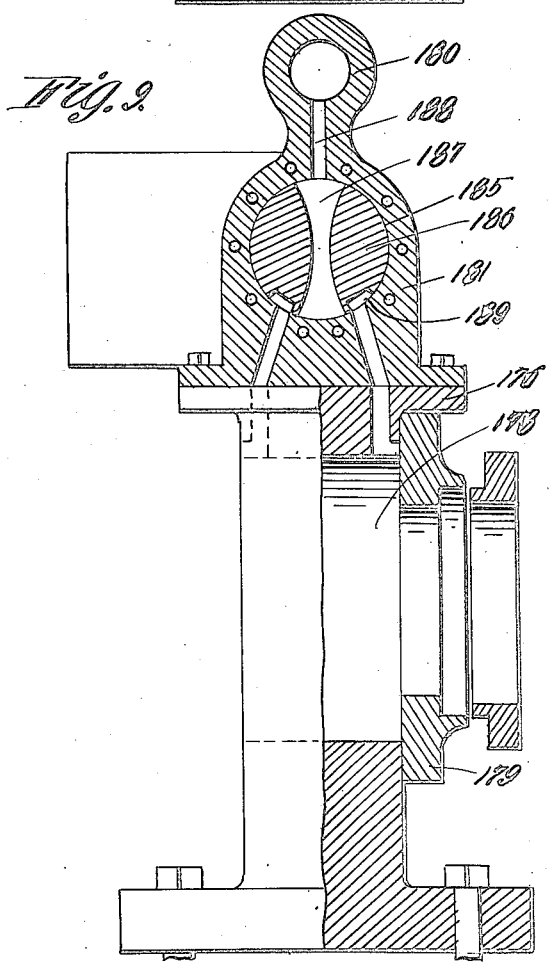

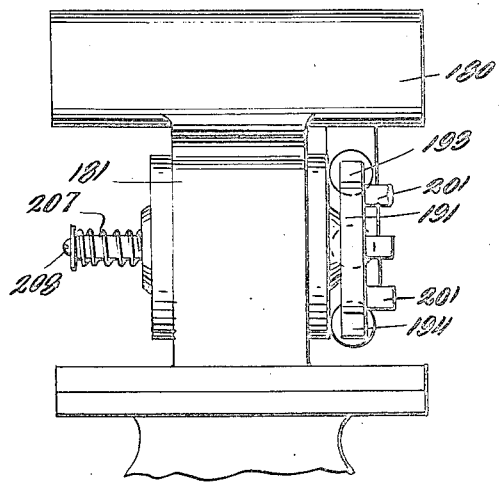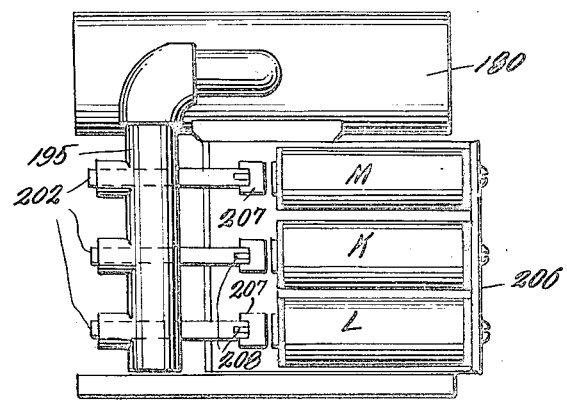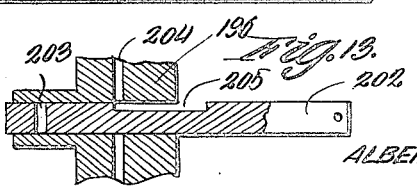

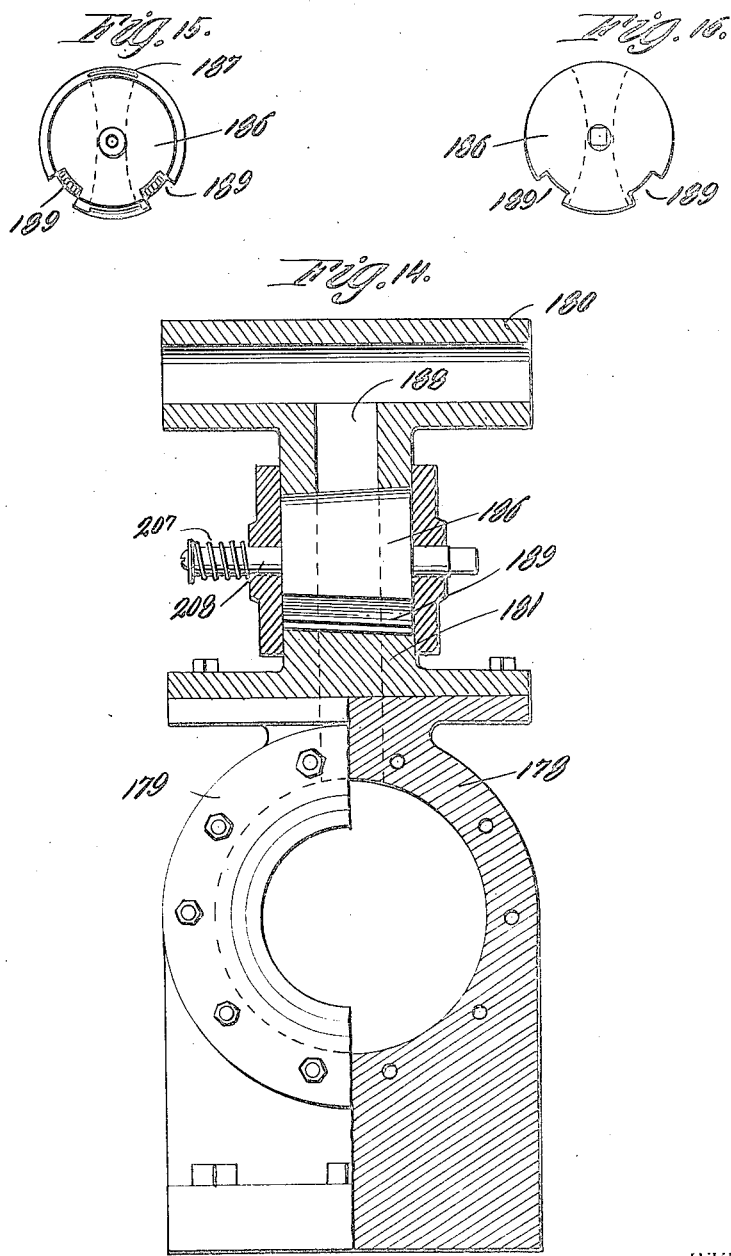

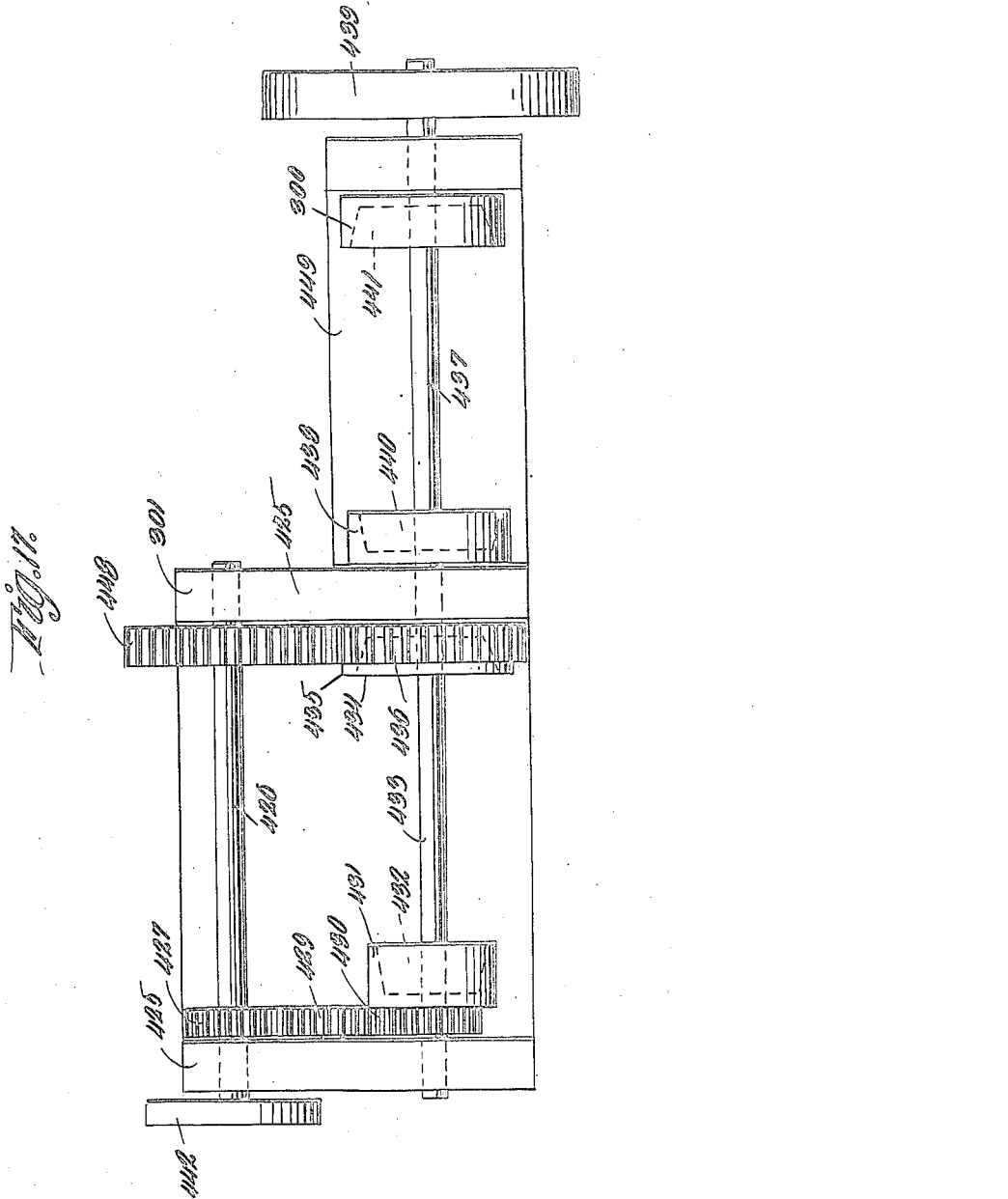

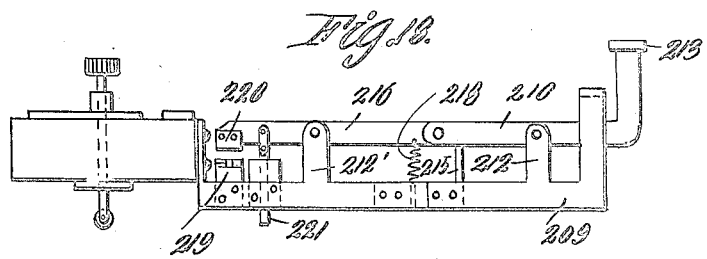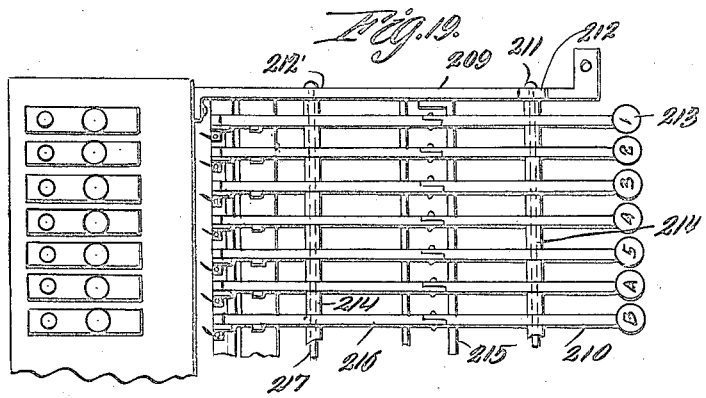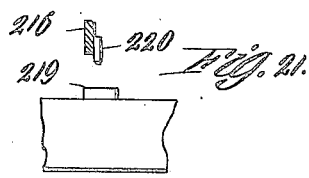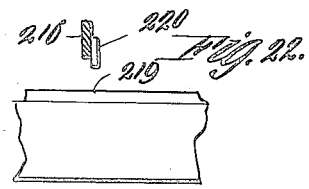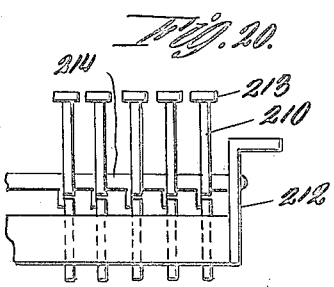

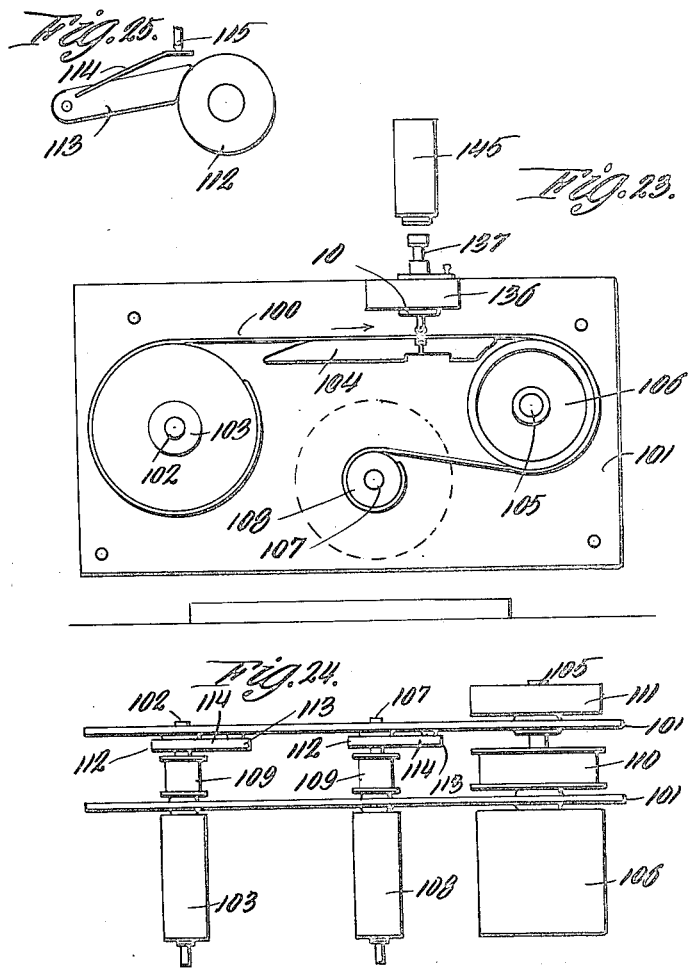

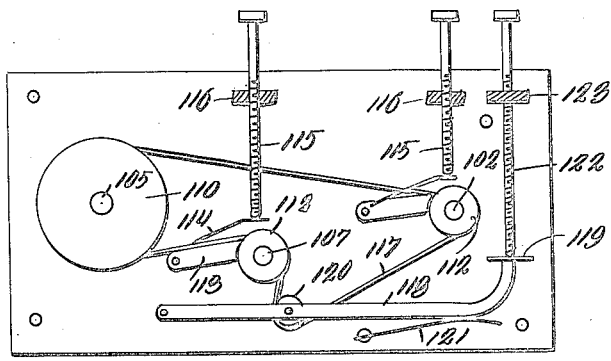
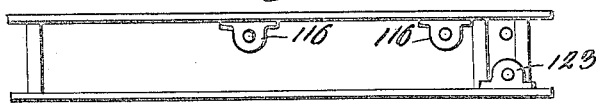
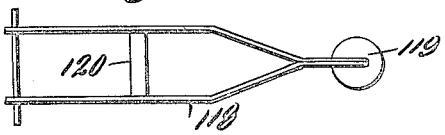
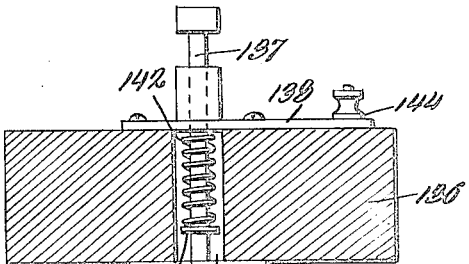

Feb. 6, 1923.
A. A. FAUST.
SPACING APPLIANCE.
FILED AUG. 11, 1921.
1,444,242.
32 SHEETS—SHEET 15.
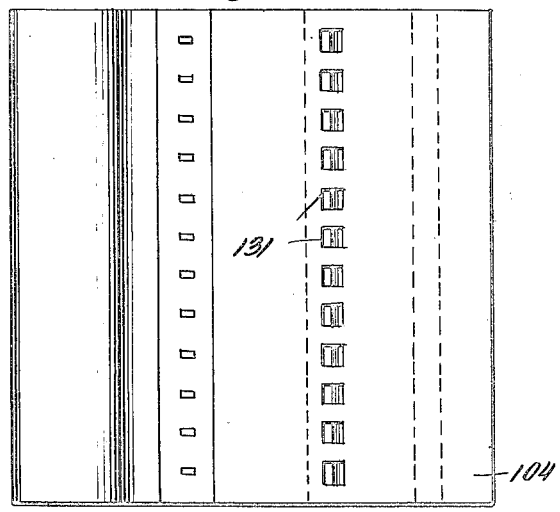
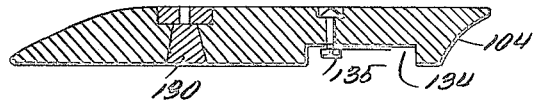
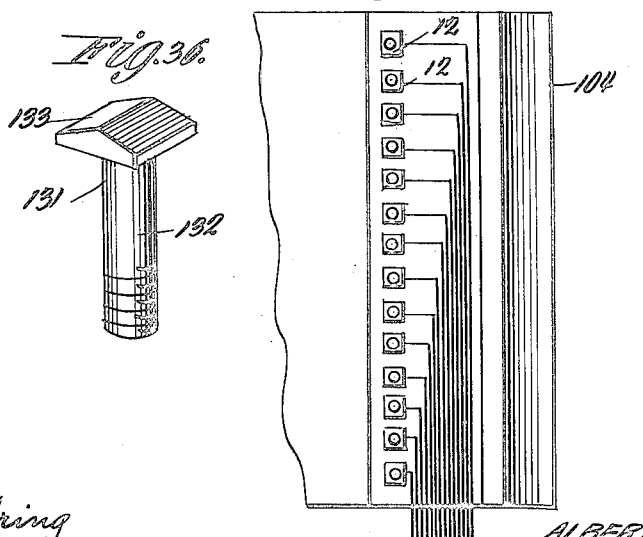
Inventor
ALBERT A. FAUST
By Richard B. Owen, Attorney
WITNESSES

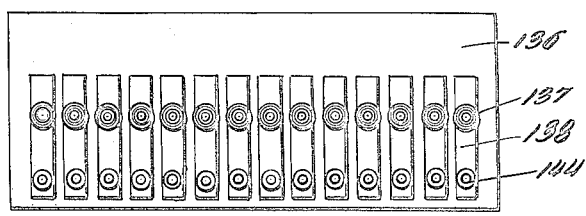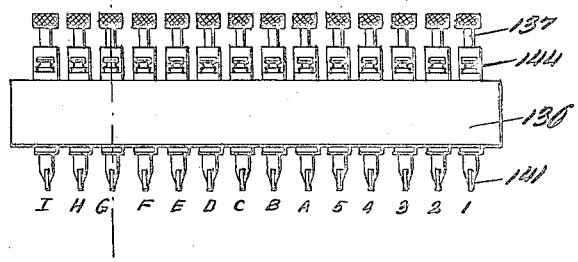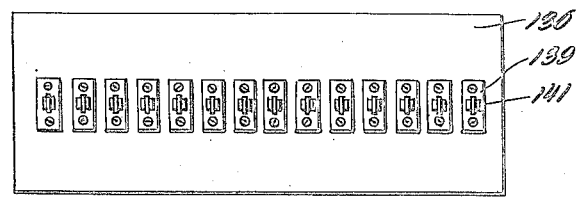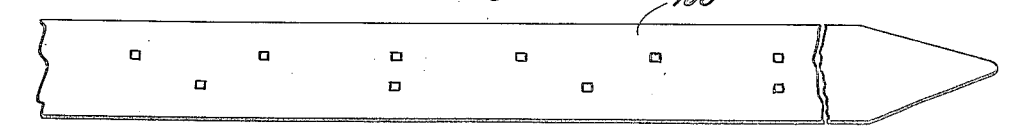

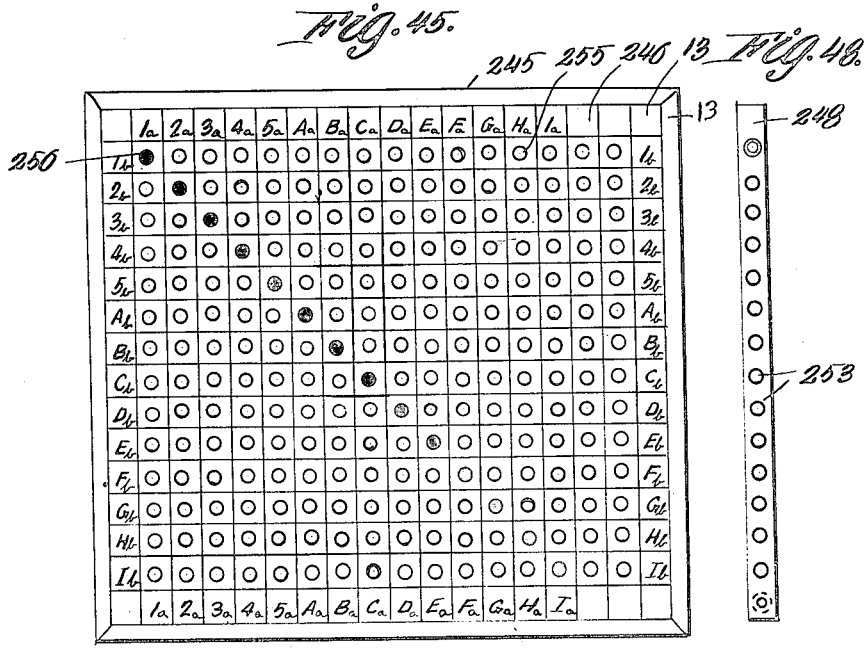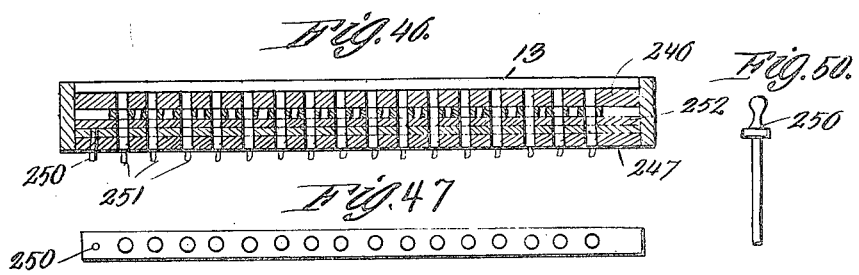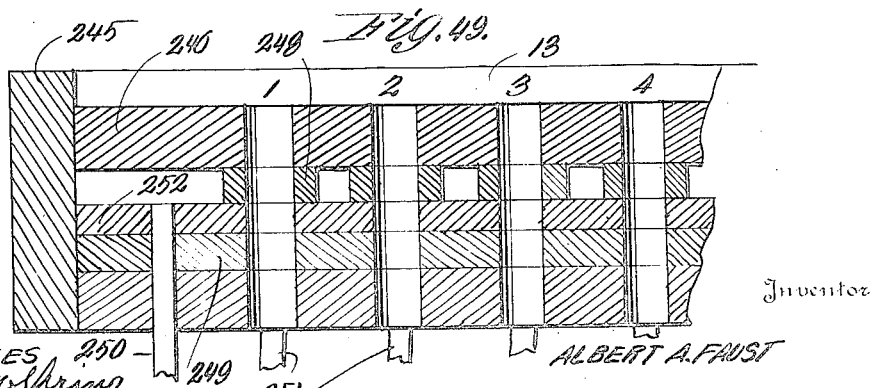

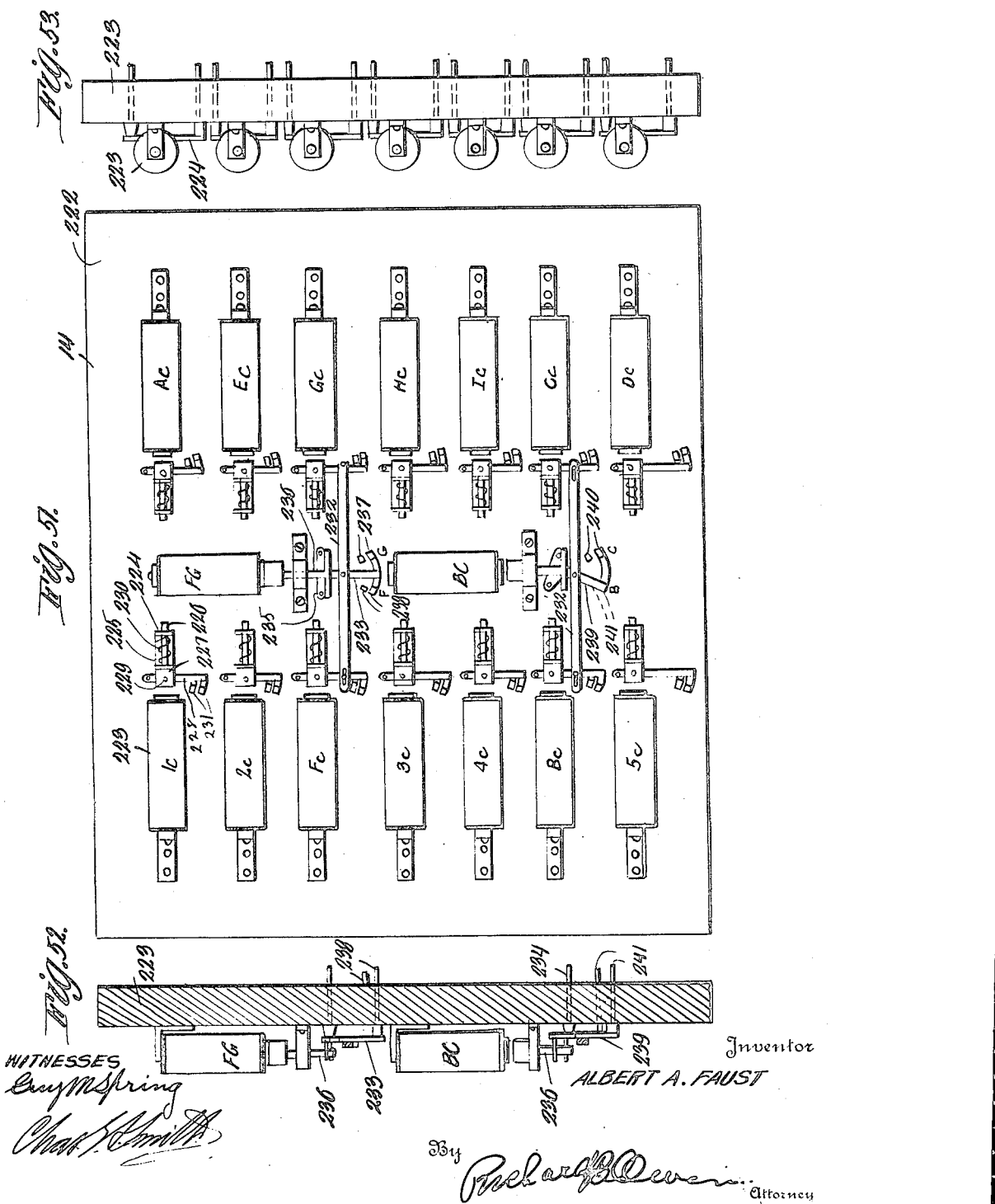

Feb. 6, 1923.
A. A. FAUST.
SPACING APPLIANCE.
FILED AUG. 11, 1921.
1,444,242.
32 SHEETS—SHEET 20.
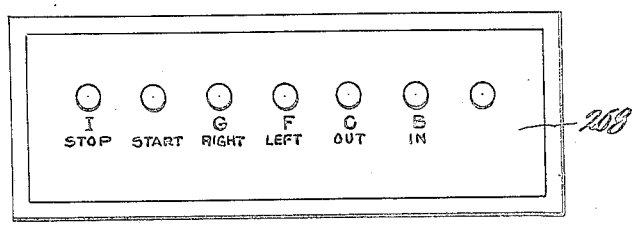
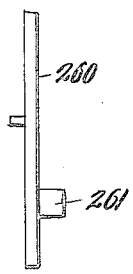
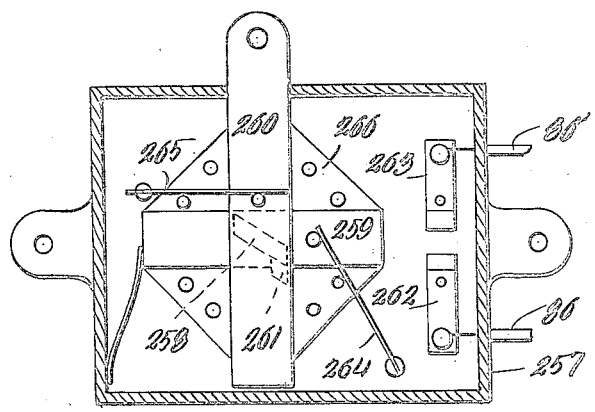
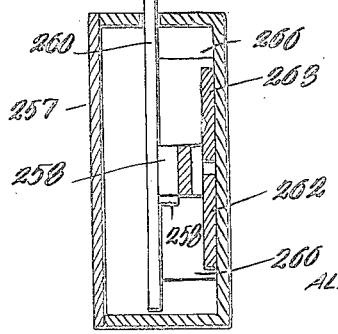
ALBERT A. FAUST, Inventor

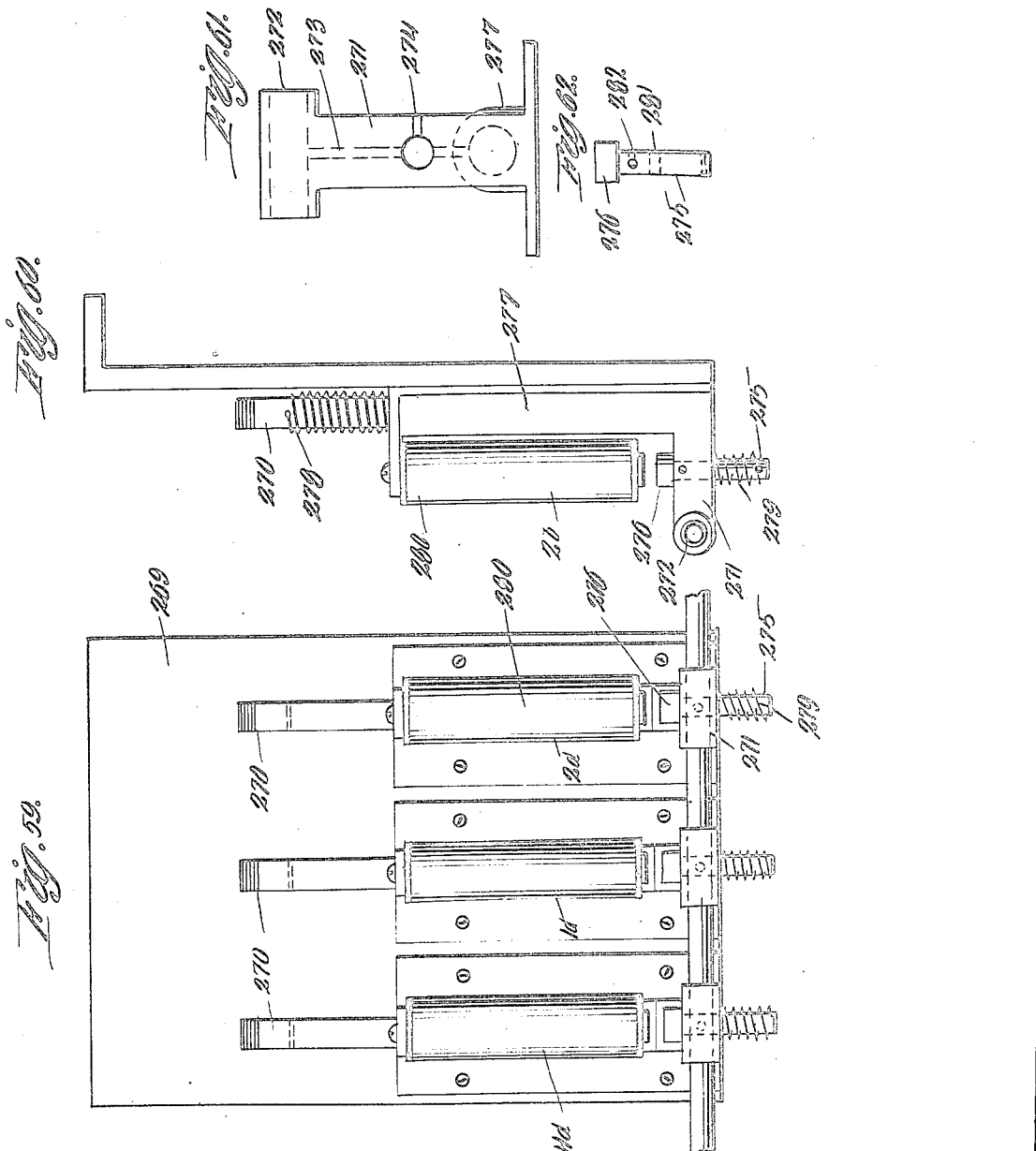

ALBERT A. FAUST
INVENTOR.

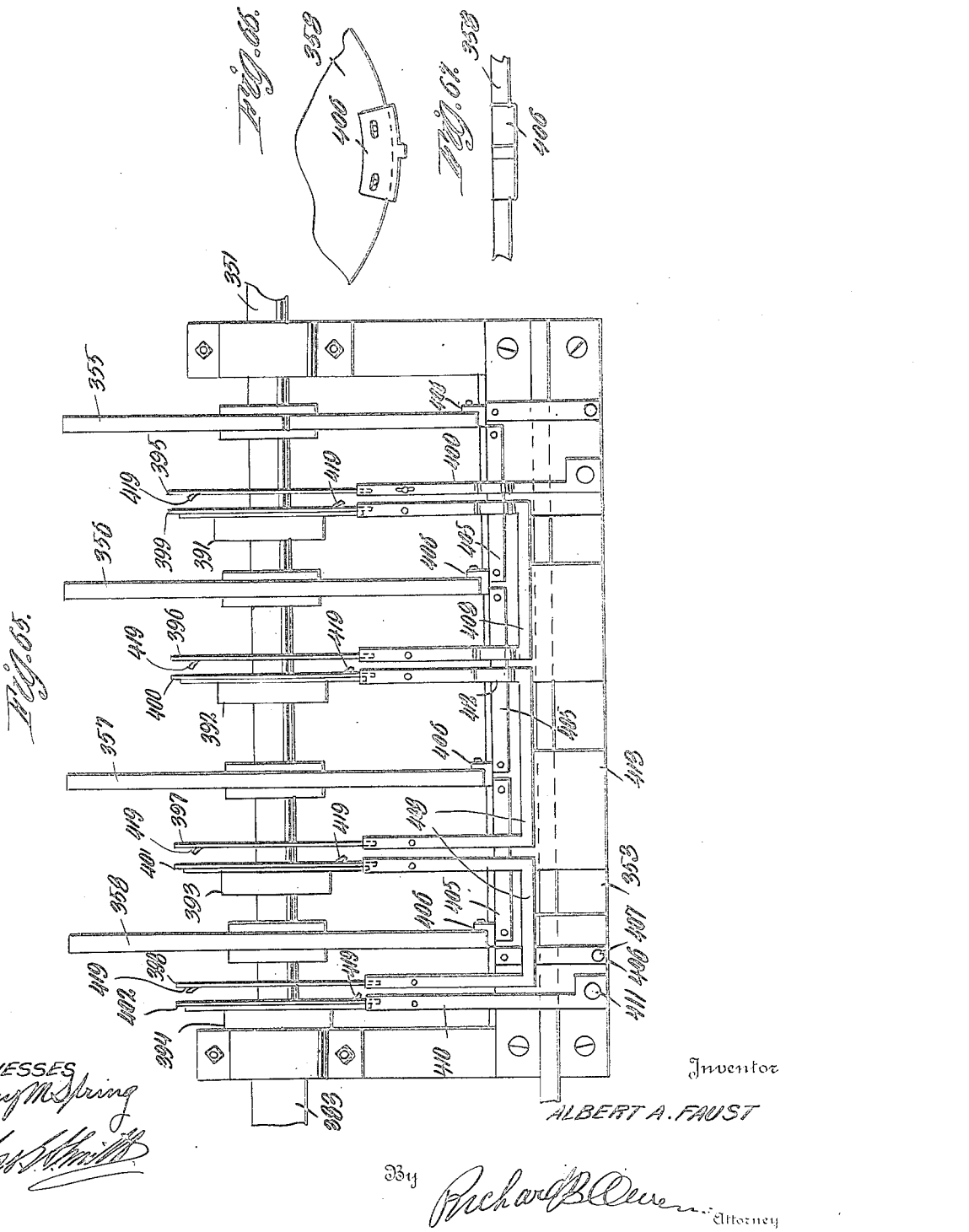

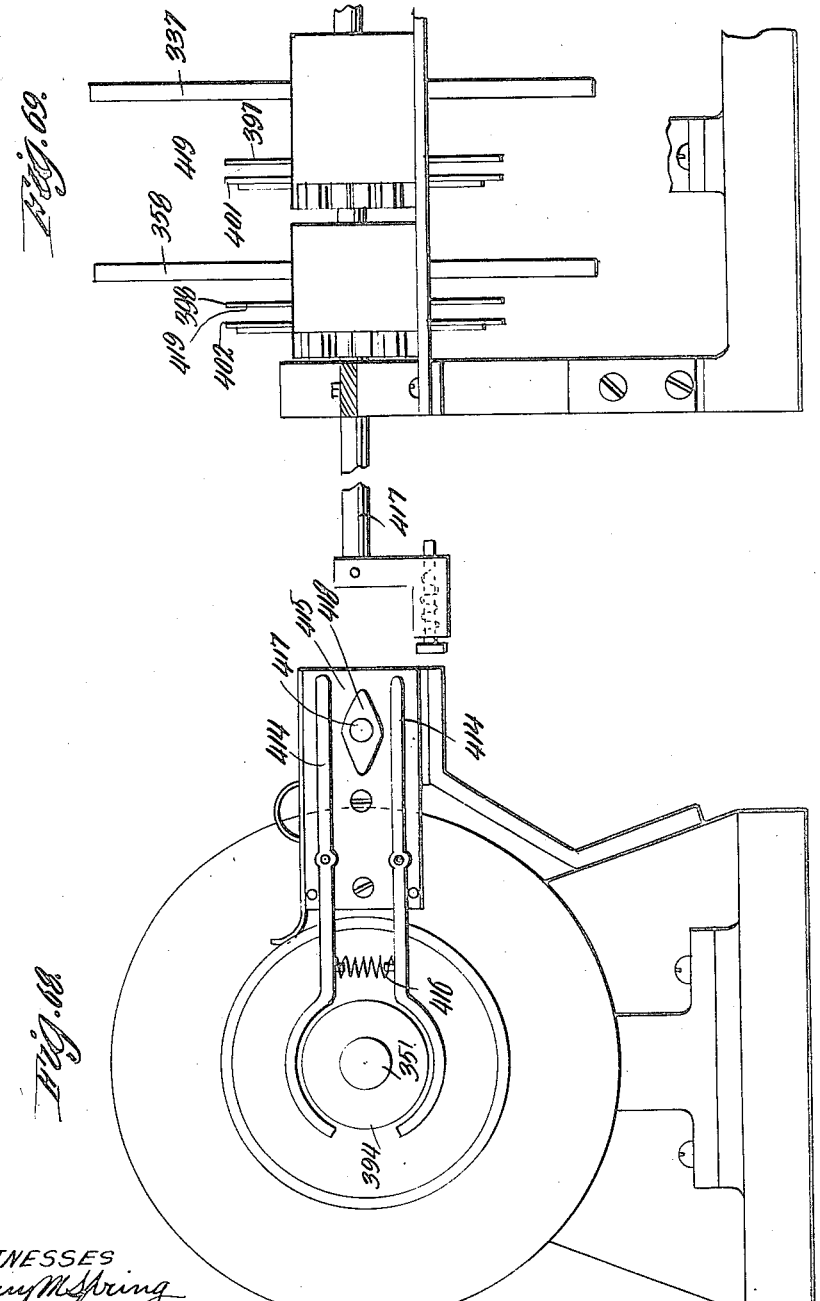

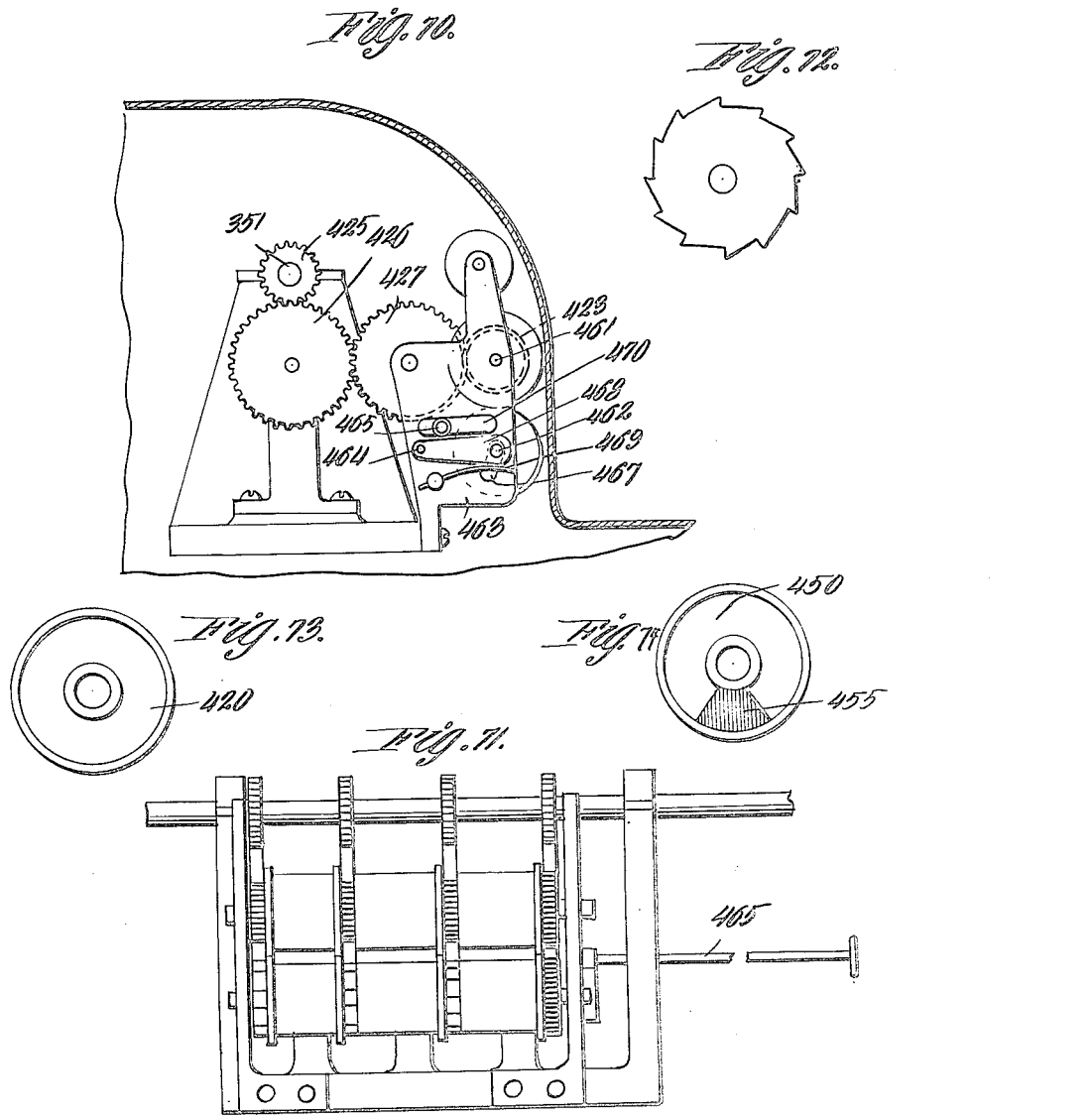

Feb. 6, 1923.
A. A. FAUST.
SPACING APPLIANCE.
FILED AUG. 11, 1921.
1,444,242.
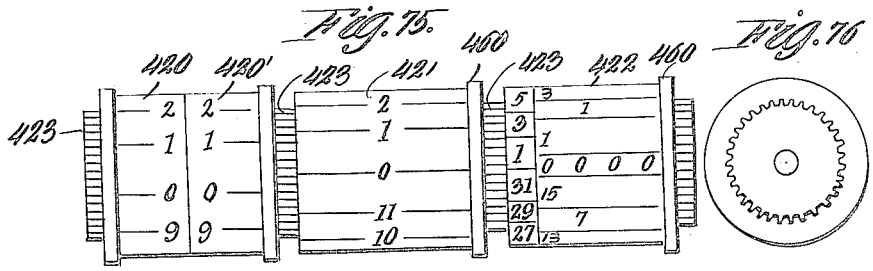
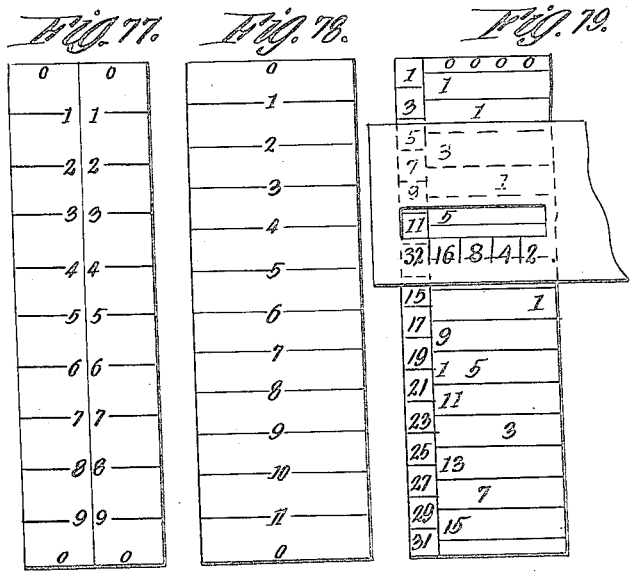
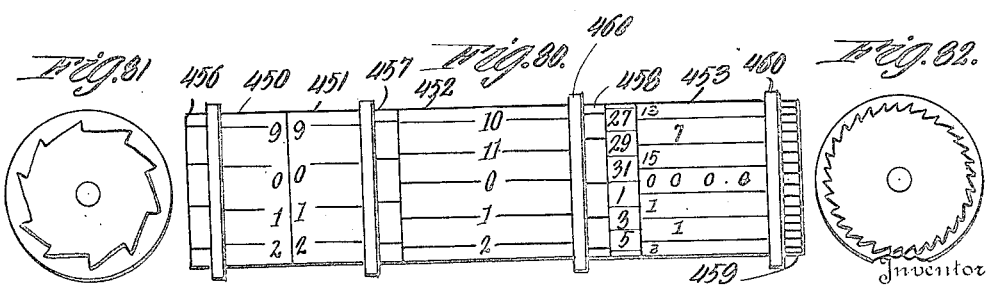
WITNESSES
ALBERT A. FAUST
Inventor
By Richard B. Owen
Attorney

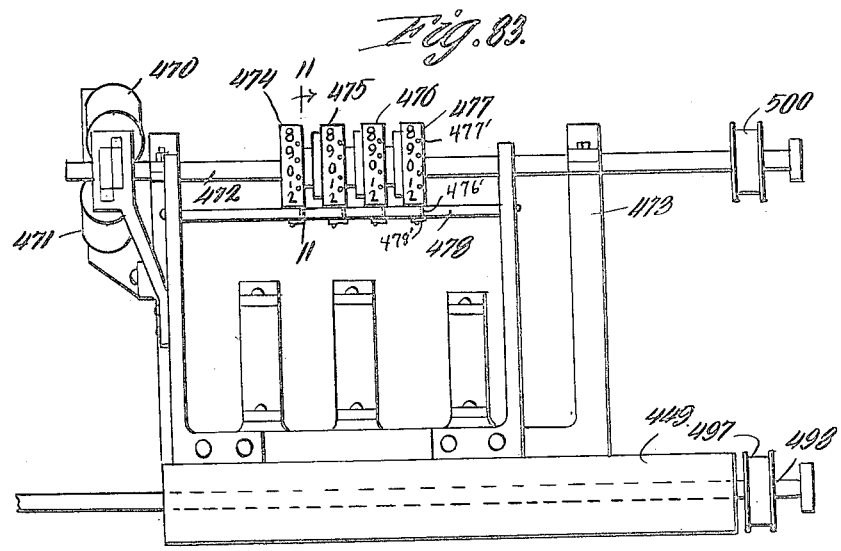
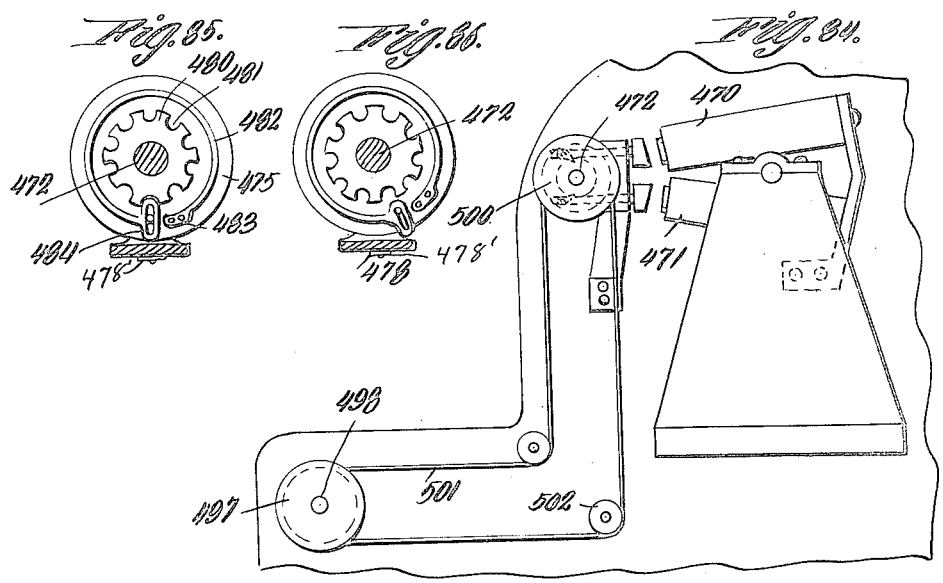
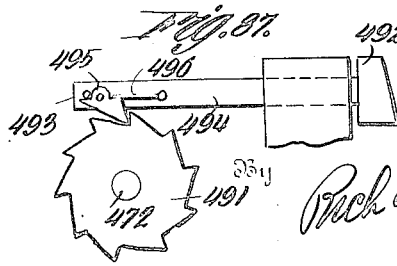

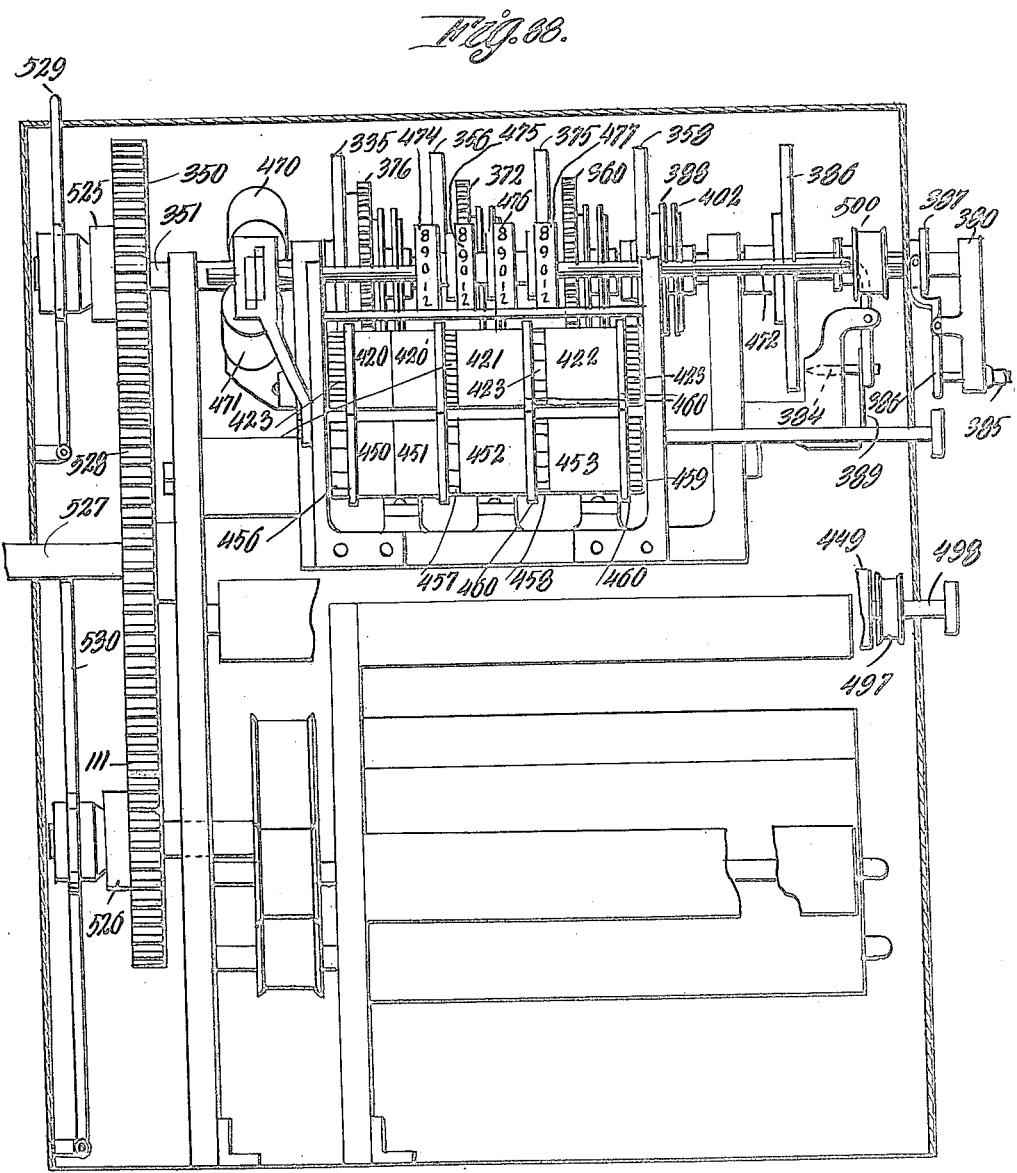

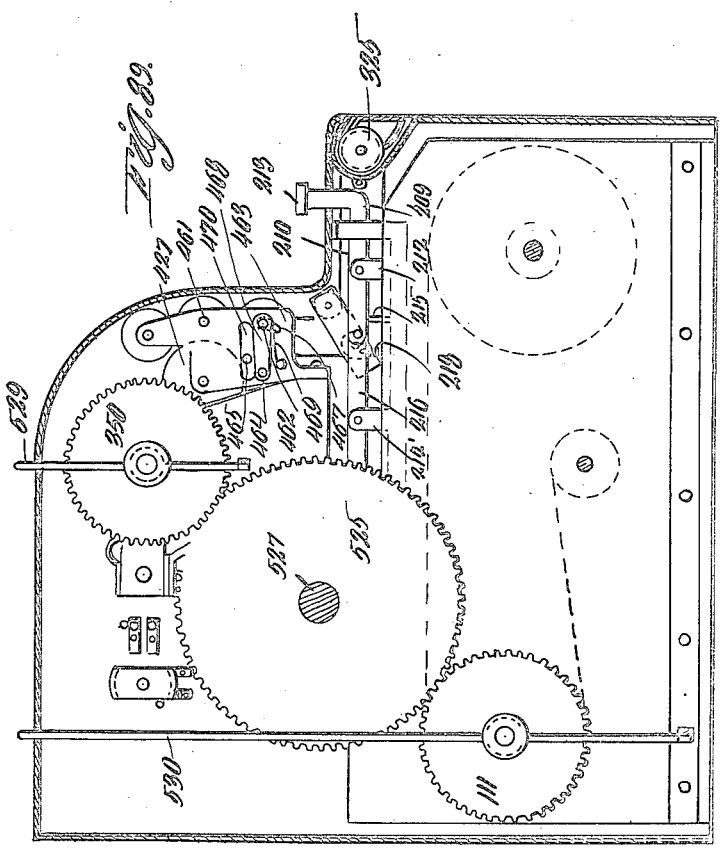

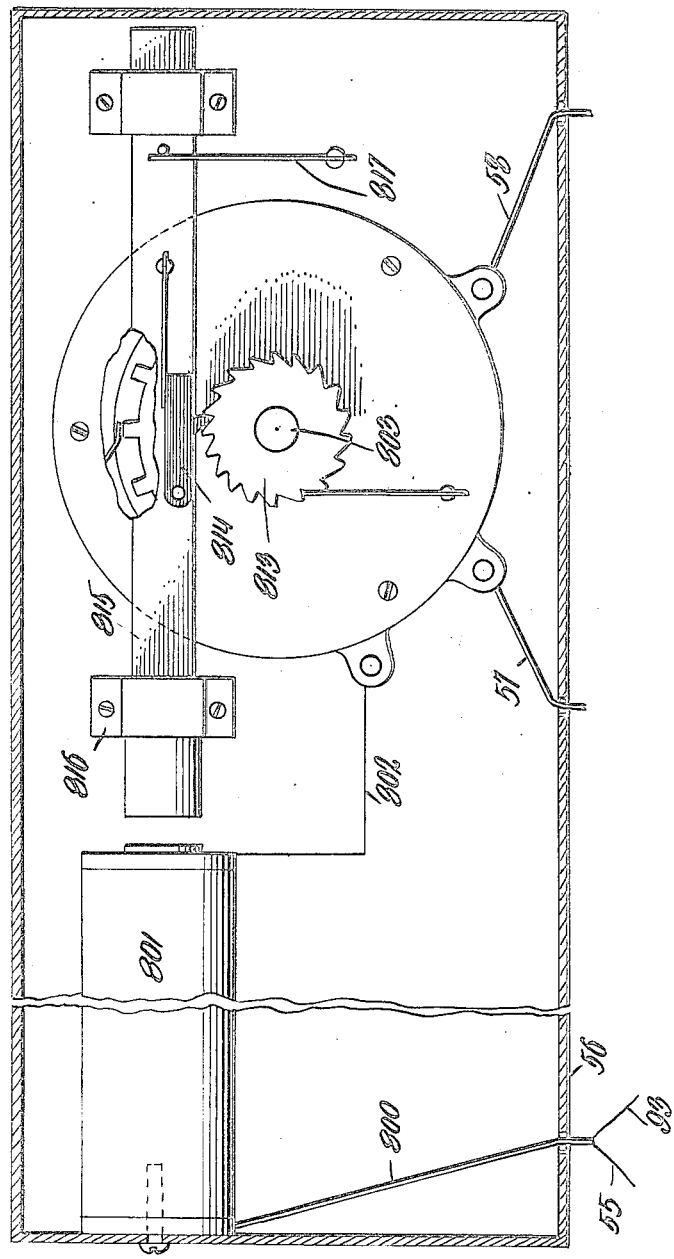

Feb. 6, 1923.
A. A. FAUST.
SPACING APPLIANCE.
FILED AUG. 11, 1921.
1,444,242.
32 SHEETS—SHEET 32.
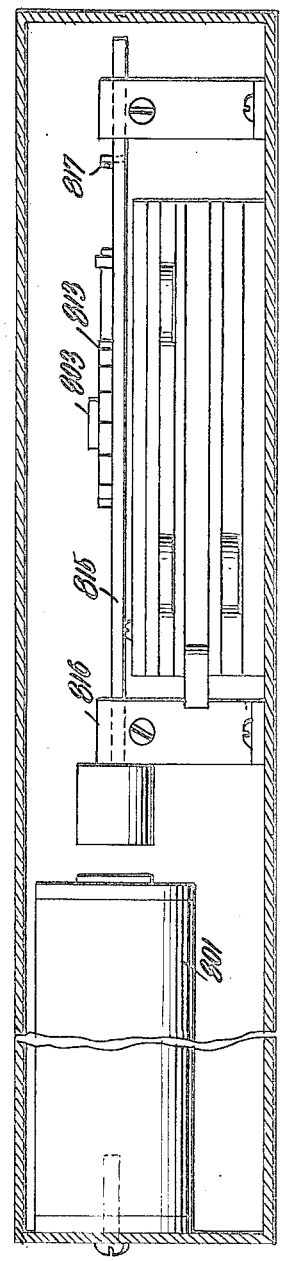
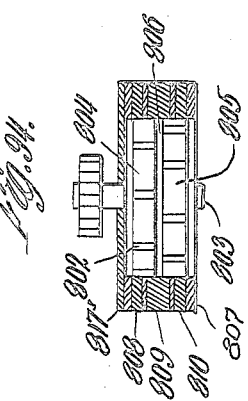
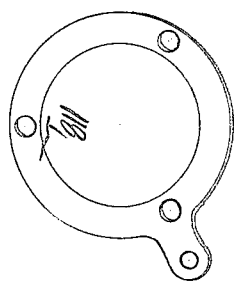
WITNESSES
ALBERT A. FAUST INVENTOR.
BY
ATTORNEY.

Patented Feb. 6, 1923.

1,444,242

UNITED STATES PATENT OFFICE.

ALBERT A. FAUST, OF DETROIT, MICHIGAN.

SPACING APPLIANCE.

Application filed August 11, 1921. Serial No. 491,429.

*To all whom it may concern:*

Be it known that I, ALBERT A. FAUST, a citizen of the United States, residing at Detroit, in the county of Wayne and State of Michigan, have invented certain new and useful Improvements in a Spacing Appliance, of which the following is a specification.

This invention relates to a spacing appliance especially useful in the metal working arts and has for its principal object to provide efficient means for relatively positioning metal shapes, beams and the like, with respect to tools, such as a punch or punches, for operating thereon, as in machines for punching the rivet holes in structural shapes.

The invention is also useful in various other industries where it is desired to control the number of revolutions or travel of any of the parts of the machines where holes are to be punched or some other purpose attained, whether a spacing table is used or some other device.

An object of the invention is to provide means for starting and stopping the spacing table at given points.

Other objects of the invention are to provide means for feeding the shapes or other work through widely varying distances, effecting feeds of a fraction of an inch or feeds of many feet, doing same expeditiously and in all cases stopping the work with precision and accuracy, under the control of an automatic distance record device, to provide for the travel of the spacing table in different directions, to provide means for preparing a record sheet, capable of governing the apparatus, for future similar locations while making the holes in the first shape, and to provide novel and useful instrumentalities of the kind indicated.

This invention eliminates the inconvenience of holding a punch press idle for a half hour and sometimes three or more hours, while the spacer is being set up as is now commonly the practice. I have carefully avoided connecting this spacing appliance with any particular spacing table, for the reason that no one spacing table can be designed to do the different classes of work and do each class to the best advantage. Spacing tables can be devised and some are in use now, that can be controlled by the apparatus herein disclosed.

The record sheet can be previously made and handed to the punch press operator by the foreman, who can set it in place in a few moments and be ready to proceed with the punching, or the spacing bill can be handed to the operator and he can punch the first shape according to the spacing bill by operating the device as herein described and simultaneously the apparatus will form a record sheet capable of operating the punches and spacing table for duplicating the initially punched shape. Thus if several pieces or shapes are to be punched similarly only a few moments, after the first shape is punched, are required to adjust the apparatus to punch the balance automatically.

Spacing devices are intended for large quantities of work as a rule since it requires too much time to set up the spacer when only a few pieces are required, but the apparatus which I herein disclose is so simple in its operation that it will be actually economical to put all shapes through the spacer if but one or two are required.

The invention consists in the novel parts, constructions, combinations and instrumentalities and improvements herein shown and described.

The accompanying drawings referred to herein and constituting a part hereof, illustrate one embodiment of the invention, and with the description referred to illustrate the principles thereof.

In the drawings:—

Figs. 1ª 1ᵇ and 1ᶜ is a diagram of the entire device.

Figure 2 is a plan view of a gusset plate,

Figure 2ª is a plan view of an order sheet filled in in accordance with the holes punched on gusset plate shown in Figure 2.

Figure 3 is a plan view of the spacing table operating mechanism,

Figure 4 is an elevation thereof,

Figure 5 is a section taken on the line 5—5 of Figure 3,

Figure 6 is a longitudinal fragmentary sectional view showing the operating mechanism in conjunction with the spacing table operating mechanism, Figure 7 is a top plan view of the controlling mechanism for the spacing table operating mechanism, Figure 8 is a side elevational view thereof, Figure 9 is a vertical sectional view thereof, Figure 10 is a plan view of the casting 176, Figure 11 is a view taken at one end thereof, Figure 12 is a view taken at the other end thereof, Figure 13 is a sectional view showing the operation of the valve mechanism used in connection therewith, Figure 14 is a sectional view taken at right angles to that shown in Figure 9, Figure 15 is a side elevational view of the valve 186, Figure 16 is a side elevation of valve 186 looking from the opposite end than that shown in Figure 15, Figure 17 is an elevational view of the record sheet operating mechanism, Figure 18 is an elevational view of the key operating mechanism and circuit closer, Figure 19 is a top plan view thereof, Figure 20 is a fragmentary front elevational view thereof, Figures 21 and 22 are detailed views of the record sheet punching mechanism.

Figure 41:
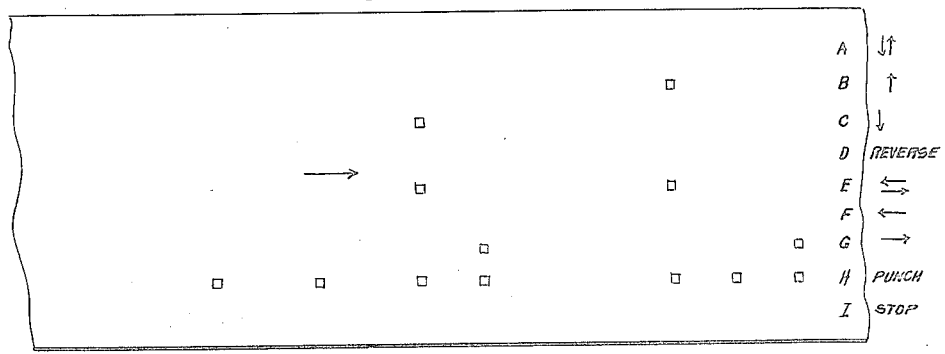
Figure 42:
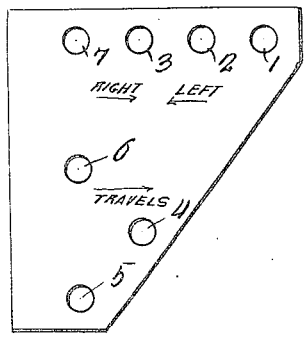
Figure 43:
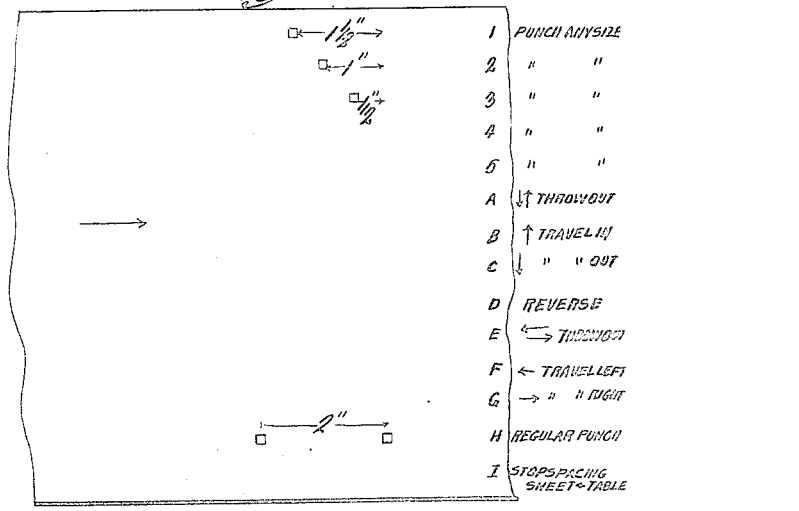
Figure 44:
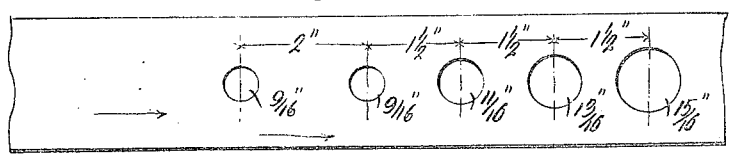
Figure 63:
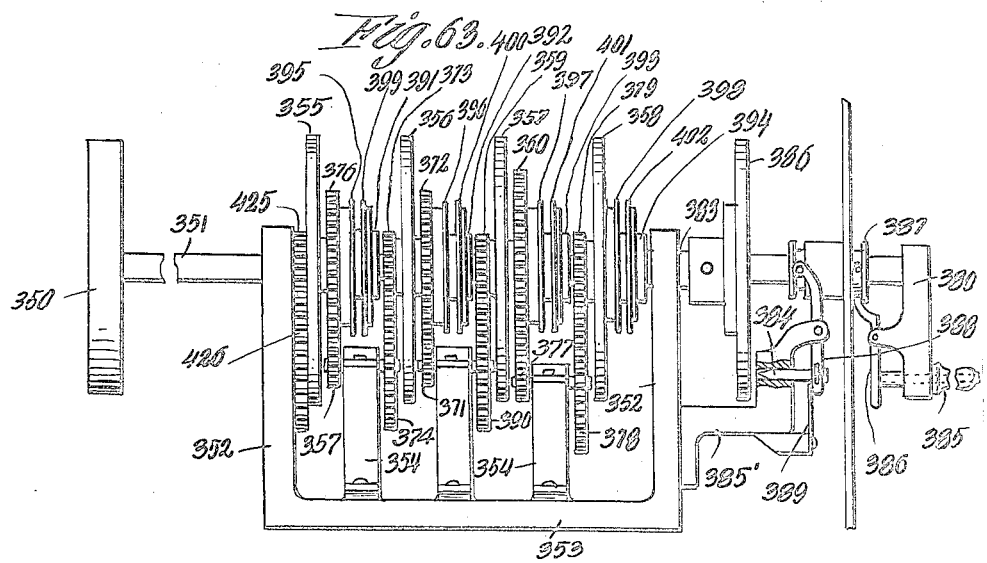
Figure 64:
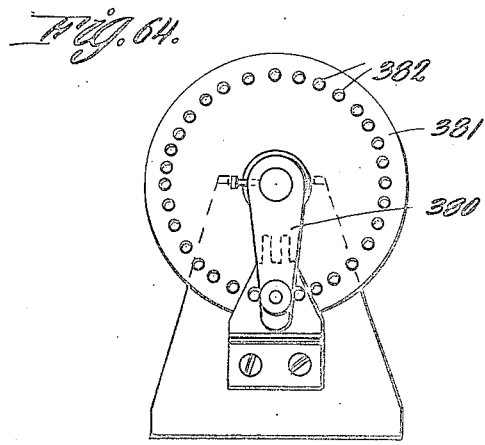

Figure 23 is an elevational view of the record sheet winding and unwinding mechanism, Figure 24 is a top plan view thereof, Figure 25 is an elevational view of a brake mechanism used in connection therewith, Figure 26 is an elevational view of a spool 103 used in connection therewith, Figure 27 is an end elevational view of the spool, Figure 28 is an elevational view of the washer 124, Figure 29 is an elevational view taken from the opposite side from Figure 23 of the record sheet winding and unwinding mechanism, Figure 30 is a plan view of the frame for the winding and unwinding mechanism, Figure 31 is a detailed plan view of the idler frame, Figure 32 is a sectional view taken through the circuit closing mechanism, Figure 33 is a top plan view of the lower portion of the circuit closing mechanism, Figure 34 is a sectional view taken therethrough, Figure 35 is a fragmentary bottom plan view thereof, Figure 36 is a detailed perspective view of the bolt 131, Figure 37 is a top plan view of the circuit closing mechanism, Figure 38 is a front elevational view thereof, Figure 39 is a bottom plan view thereof, Figure 40 is a plan view of one form of the record sheet, Figure 41 is a plan view of another form of the record sheet, Figure 42 is a plan view of a gusset plate, Figure 43 is a plan view of still a further form of the record sheet, Figure 44 is a plan view of a bar, Figure 45 is a plan view of the circuit changing mechanism, Figure 46 is a sectional view taken therethrough, Figure 47 is a plan view of the bar 249, Figure 48 is a plan view of the bar 248, Figure 49 is an enlarged fragmentary sectional view taken through the circuit changing mechanism, Figure 50 is an elevational view of the circuit closing pin 256, Figure 51 is a top plan view of the switch operating mechanism 14, Figure 52 is a sectional view taken therethrough, Figure 53 is an end elevation thereof, Figure 54 is a sectional view taken through the automatic switch 257, Figure 55 is a sectional view taken through the automatic switch at right angles to the view in Figure 54, Figure 56 is an elevational view of the bar 259, Figure 57 is an elevational view of the bar 260, Figure 58 is an elevational view of the auxiliary switch board 268, Figure 59 is an elevational view of the punch gauge operating mechanism, Figure 60 is an end elevational view thereof, Figure 61 is an elevational view of the cylinder used in connection therewith, Figure 62 is an elevational view of the armature valve 275, Figure 63 is an elevational view, with certain parts now shown, of the distance record mechanism, Figure 64 is an end elevational view thereof, Figure 65 is an enlarged elevational view thereof with the gearing removed, Figure 66 is a fragmentary plan view of the disk 358, Figure 67 is a fragmentary edge elevational view of the disk 358, Figure 68 is an end elevational view of the distance record mechanism, Figure 69 is a fragmentary elevational view of one end of the distance record mechanism, Figure 70 is a fragmentary section taken through the casing 324 showing the counting mechanism, Figure 71 is a front elevational view of the counting mechanism, Figure 72 is an elevational view of the ratchet wheel 458, Figure 73 is an end view of one of the upper counting drums, Figure 74 is an end elevation of one of the lower counting drums, Figure 75 is a front elevational view of the upper drums of the counting mechanism, Figure 76 is a side elevational view thereof, Figure 77 is a diagrammatic view of the periphery of drums 420 and 420', Figure 78 is a diagrammatic view of the periphery of drum 421, Figure 79 is a diagrammatic view of the periphery of drum 422, Figure 80 is a front elevational view of the lower counting drums, Figure 81 is an end elevational view thereof, Figure 82 is an end elevational view thereof taken oppositely from Figure 81, Figure 83 is an elevational view of the counting mechanism recording the number of spaces or holes punched, Figure 84 is an end elevational view thereof, Figure 85 is a section taken on the line 11—11 of Figure 83 looking in the direction of the arrow, Figure 86 is a similar view showing the mechanism in a slightly different position, Figure 87 is a detailed elevational fragmentary view showing the operating mechanism for this counting mechanism.

Figure 90:
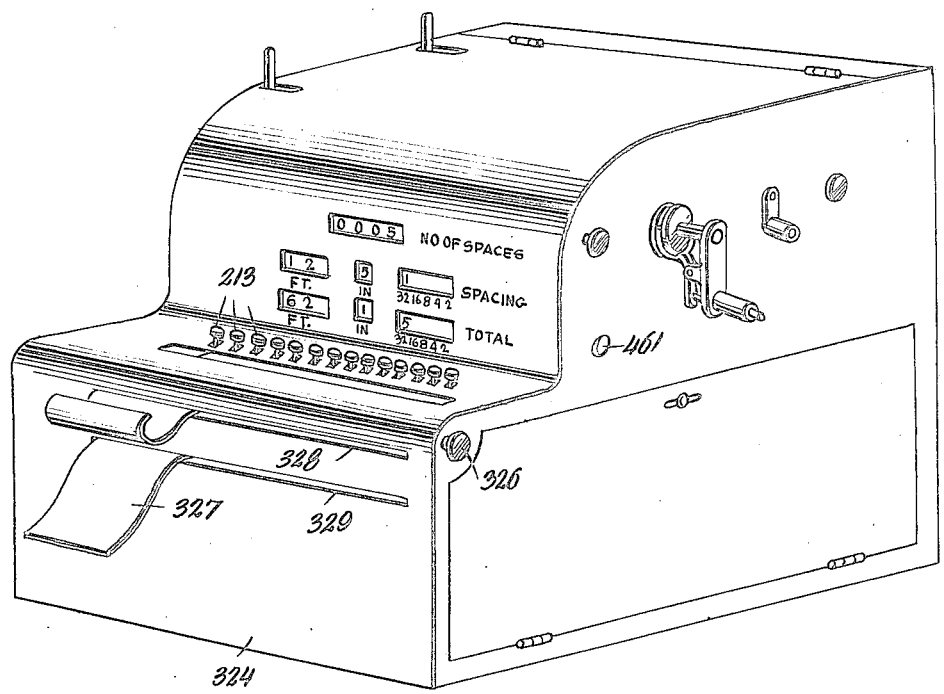
Figure 91:
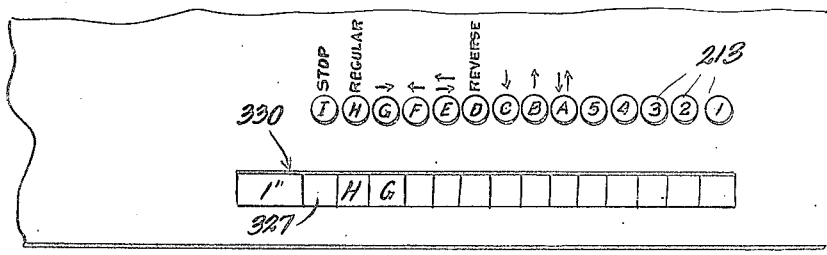

Figure 88 is a longitudinal section taken through the casing 324,

Figure 89 is a transverse section therethrough,

Figure 90 is a perspective view of the operator's machine,

Figure 91 is a fragmentary plan view showing the relation of the operator's machine with the spacing bill and circuit closing keys, Figure 92 is a section taken through the casing of the alternating switch, Figure 93 is another section taken at right angles to Figure 92, and Figures 94 and 95 are details of the alternating switch.

Referring to the drawing in detail it is necessary to describe each portion of the spacing appliance separately in order that a correct conception may be obtained as to the operation of the entire appliance. In Figures 3 to 5 there is disclosed means for moving a spacing table relatively to a tool equipped means. Since the spacing table is well known in the metal working art the same is not shown in the drawing, it being well within the skill of any ordinary mechanic to connect the spacing table with the means about to be described as will be evident to those skilled in this art. The numeral 150 indicates the frame as a whole which supports the operating mechanism for the spacing table. This frame 150 consists of the side members 150', which are connected by the front member 152 and the rear member 151. An intermediate member 153 connects the side member 150' intermediate their ends. A suitable drive shaft 154 is journaled in the front member 152 and intermediate member 153 and is provided with a driving pulley or gear 155. Between the members 152 and 153 and adjacent member 152 there is mounted on the drive shaft 154 and keyed thereto a gear 156. A pair of idler gears 157 are situated one on each side of the gear 156 and mesh therewith and are rotatably supported on the member 152. The shafts 158 and 159 are suitably journaled in the members 152 and 153 and are provided adjacent member 152 with the female clutch segments 160 and 161 which are provided with gear segments 162 fixed thereto meshing with the idler gears 157. The female clutch segment 160 is rotatable independently of the shaft 158 while the similar segment 161 is likewise rotatable independently of the shaft 159.

A male clutch segment 163 is keyed to the shaft 158 but slidable thereon while a similar male clutch segment 164 is keyed to shaft 159 but slidable thereon. A gear wheel 165 is rotatably mounted on the shaft 158 and also forms a female clutch segment. A similar gear wheel 166 is rotatably mounted on the shaft 159. A gear 165' is keyed to shaft 154 so as to mesh with the combined gear and clutch members 165 and 166. Male clutch segments 167 are mounted on the shafts 158 and 159 and are capable of engaging the clutch portions of members 165 and 166. The male clutch segments 167 are connected to the respective clutch segments 163 and 164 by means of sleeves 168 suitably slidable on shafts 158 and 159 as more clearly illustrated in Figure 6.

The shafts 158 and 159 extend through the intermediate portion 153 and are provided upon their ends with female clutch segments 169 which are keyed to their respective shafts. The shafts 170 and 171 are suitably journaled in the rear portion 151 and terminate as shown in Figure 5 adjacent the ends of shafts 158 and 159 respectively. The shaft 170 operates the spacing table to the right or to the left while the shaft 171 will be suitably connected to the spacing table so as to operate same "in" or "out". A sleeve 168' which is of similar construction to the sleeve 168 is slidably mounted one on each of the shafts 170 and 171. The male clutch segments 172 are keyed to the shafts 170 and 171 and connected to the sleeves 168' and are engageable with the female clutch segments 169. Similarly constructed male clutch segments 173 are keyed to shafts 170 and 171 and connected to the slidable sleeves 168'. The female clutch segments 174 are loosely mounted on the shafts 170 and 171 and are engageable by the male clutch segments 173. These clutch segments 174 are also fixed to the rear portion 151 so as to prevent their rotation. Thus it will be seen that the segments 173 and 174 form a brake mechanism for the shafts 170 and 171.

Presuming in the drawings, referring to Figure 3 that the drive shaft 154 is rotating in a clockwise direction it will be seen that by moving the sleeve 168 toward the member 152 that the shaft 158 will be rotated in a similar direction. If however, this sleeve 168 is pushed so that the segment 167 engages the gear 165 this shaft 158 will rotate in an opposite direction from the shaft 154. Thus it will be seen that the sleeve 168 and the clutch segments 163 and 167 form a reversing mechanism.

The operation of the driven shafts 170 and 171 is quite similar. If the sleeve 168' to the right of Figure 3 is moved toward the bottom of the figure the male clutch segment 172 will engage the female clutch segment 169 and thus the shaft 170 will be rotated in unison with the shaft 158. If this sleeve 168' to the right of Figure 3 is moved toward the top of the figure is will disengage the clutch segments 172 and 169 and at the same time engage the clutch segments 173 and 174 which will act as a brake upon this shaft 170. The operation of shaft 171 with respect to shaft 159 is exactly similar and it is not necessary to go into details concerning the same.

In order to operate the sleeves 168 and 168' they have been provided with piston heads 176 each of which will be slidably mounted in a cylinder (see Figure 6) having a suitable cylinder head 179. This piston 176 will be operated by compressed air fed through the main supply pipe 180. A casting 181 is mounted upon the casting 182 which leads into the cylinder 178 and is provided with a pair of openings 183 which register with openings 184 in the casting 181 and lead to a bore 185 in which is rotatably mounted a cylindrical valve 186 having a diametrically extending transverse opening 187. This valve is operable so that the opening 187 will register with either of the openings 184 upon the rotation of the valve. An opening 188 leads from the main supply pipe 180 and always is in communication with the opening 187. Grooves 189 are provided in the valve 186 on either side of the lower end of the diametrically extending opening 187. These grooves 189 form outlets as will be explained later.

As thus far described it will be seen that as the compressed air passes through the openings 184 and 183 to the left (in Figure 6), the piston head 176 will be forced to the right and thus release the connection between the female clutch segment 160 and the male clutch segment 163 and at the same time connect the clutch segment 167 with the gear clutch 165. Thus the shaft 158 will be rotated in an opposite direction from the shaft 154. When the valve 168 is rotated to a neutral position the air in cylinder 178 will be released through the grooves 187 and thus the springs 190 which are disposed between the segments 160 and 163 and between segments 167 and 165 will return the piston head 176 to a central position in the cylinder 178.

The valve 186 is provided at one end with a rectangular plate 191 (see Figure 8) which is fixed thereto so as to rotate therewith. This plate 191 is provided with gear segments 192 one at each end which are in mesh with the rack plungers 193, and 194. A branch pipe 195 leads from the main supply pipe 180 and secondary branches or cylinders 196, 197 and 198 extend therefrom and receive the rack plungers 193 and 194 and the plunger 199. This plunger 199 is provided with a bifurcated head 200, the portions of which are adapted to engage the lugs 201 fixed on the plate 191 for a purpose which will later appear.

Slide valves 202 (see Fig. 7) pass transversely through the cylinders 196, 197 and 198 and are shown in detail in Figure 13. It will be noted that each of these slide valves 202 is provided with a passage 203 which, when in communication with passage 204, will allow the air to pass into the respective cylinders 196, 197, and 198. These slide valves 202 are also provided with cutout outlet portions 205 which will release the air which has been forced into either of the cylinders 196, 197 or 198. The solenoids M, K, and L (Figures 11 and 12) are suitably mounted on a bracket 206. A core 207 is disposed by each of the above named solenoids. These cores 207 are fixed to the lever 208 (see Figure 7) which are pivotally mounted to the brackets 206. The other ends of these levers 208 are suitably pivoted to the slide valves 202. These levers 208 normally lie on the stop 209 and are held thereon by means of compression coil springs 210. Upon energization of the solenoid M the corresponding lever situated therebeneath 208 will be raised thus sliding the valve 202 attached thereto so that the air will be delivered to the cylinder 196 thereby forcing the plunger 193 to the left of Figure 4 and rotating the valve 186 in a counter-clockwise direction so that it will register with the openings 184 and 196 (see Figure 6) and engage the clutch segments 160 and 163. Upon energization of the solenoid L the operation will be reversed as will be understood without further explanation. Upon energization of solenoid K it will be evident that the plunger 199 will be forced to the left in Figure 8 and that the head 200 will engage the lugs 201 and force the valve into a neutral position. This valve operating mechanism has been described in connection with piston head 176 mounted on the sleeve 168 on shaft 159 but it will be understood that the piston heads 176 on sleeves 168 on shaft 158 will be operated by a similar mechanism controlled by solenoids M' K', L', and sleeve 168' on shaft 171 by solenoids CL and BRA, and sleeve 168'' on shaft 170 by solenoids CLU and BR. The solenoids CL and CLU correspond to solenoid M while the solenoids BR and BRA correspond to solenoid L there being no need for a solenoid corresponding to solenoid K as will be evident later. These latter solenoids are only shown diagrammatically in Figure 1.

A coil spring 207 is disposed on the shank 208 of the valve 186 and will tend to keep this valve in snug contact with bore 185 thus preventing leakage.

Referring to Figure 17 of the drawing it will be noted that there is disclosed the operating device for actuating the winding and unwinding record sheet mechanism which will be described later. This mechanism as shown in Figure 17 is a half section of the spacing table operating mechanism disclosed in Figure 3 and it will be operated by a like system of air devices but upon a much smaller scale and these air devices will be controlled by magnets as will later appear.

Referring specifically to the construction disclosed in Figure 17 it will be seen that the numeral 301 designates this operating mechanism generally which consists of the spaced standards 425 in which is journaled the shaft 426 having upon one end the drive pulley wheel or gear 442 which will be suitably connected to or driven by shaft 154 disclosed in Figure 3. The shaft 426 is provided with a gear 427 at one end and at the other end with a larger gear of twice its size indicated by the numeral 448. An idler gear 429 is disposed between the gear 427 and a gear 430 which is mounted and rotatable independently of shaft 433. A female clutch segment 431 is fixed to the gear 430 while a male clutch segment 432 is keyed to shaft 433 and slidable thereon and will be actuated in unison with a sleeve (not shown) which actuates a male clutch segment 434 working in conjunction with a female clutch segment 435 fixed to gear wheel 436. The gear wheel 436 is in mesh with the gear wheel 448. Thus when the male segment 432 is in connection with the female clutch segment 431 the shaft 433 will rotate in the same direction with shaft 426, and on the other hand when clutch segments 434 and 435 are engaged the shaft 433 operates in an opposite direction from the shaft 426. The shaft 433 is connected to shaft 437 similarly as shafts 158 and 170 are connected as shown in Figure 5. The female clutch segment 438 is keyed to shaft 433 while the male clutch segment 440 is keyed to shaft 437 so that upon engagement of these two segments the shaft 437 will operate in unison with shaft 433. Clutch segments 300 and 441 form a brake mechanism. The male clutch segment 441 is keyed and slidable on shaft 437 while the female clutch segment 300 is fixed to the frame 449. A pulley wheel or gear wheel 439 is keyed to shaft 437 and will operate a winding and unwinding mechanism to be hereinafter described.

In Figures 18 to 22 there is disclosed the construction of the operating keys 210 which will close circuits for operating the punches and the spacing table and at the same time perforate the record sheet 100 so that the work being performed may be duplicated as frequently as desired by using the record sheet 100 as will appear later. These operating keys 210 are pivotally mounted intermediate their ends on a bolt or rod 211 which is suitably mounted in the supports 212. Each key 210 is provided with a finger button 213 which will be designated with a number or letter corresponding to the circuit which this key will close as will be more clearly explained later. Suitable spacing collars 214 are disposed on the rods 211 between the keys 210 and the inner end of these keys normally rest upon a support 215. Switch levers 216 are pivotally mounted intermediate their ends on the rod 217 carried by the supports 212' and are pivoted to the inner end of the keys 210 by means of a pin passing through slots provided in these levers. These levers 216 are suitably spaced by collars 214 and are normally held in alignment with the keys 210 by the coil springs 218. A pair of spaced contacts 219 are disposed below the outer ends of the levers 216 on frame 209 so that a circuit may be closed therebetween by bridging them with the conductor blocks 220 mounted upon the outer ends of the levers 216 and insulated therefrom. The circuits which will be closed by the contacts 219 and blocks 220 are respectively the same circuits as will be closed by the contacts 131 and 141 as will appear later. It will also be noted that as the blocks 220 engage the contacts 219, the punch 221 will engage the record sheet 100 passing over table 104 (see Figure 23) and perforate the same. This punch 221 is complementary and works in conjunction with the dies 230 on the table 104 over which the record sheet 100 passes. The contacts 219 are more clearly disclosed in Figures 18 and 19. One of these contacts, the one to the right in Figure 18, is in the form of a bar and will be electrically connected to a source of electrical energy while the other contacts 219 are separated from each other and will be suitably wired to operate the system as will be hereinafter described.

Attention is now called to Figures 23 to 31 inclusive. The record sheet 100 is disclosed in connection with its winding and unwinding mechanism. The record sheet 100 is mounted in a frame formed by the two parallel spaced plates 101. The shaft 102 is journaled into the plates 101 and extends therebetween and therebeyond, (see Figure 24). A spool 103 is mounted on this shaft 102 and is adapted to receive the record sheet 100 wound thereon. This record sheet 100 passes from the spool 103 over the table 104. A shaft 105 is journaled in the plates 101 and extends therebetween and therebeyond and has keyed thereto a roller 106 over which the record sheet 100 passes. A shaft 107 is disposed between the spool 103 and roller 106 and has mounted thereon a spool 108. The shaft 107 and the spool 108 are similar to the shaft 102 and the spool 103. The record sheet 100 is to be wound upon the spool 108 when the same is traveling in the direction of the arrow as shown in Figure 23. Between the plates 101 there are positioned the pulley wheels 109 and 110. The pulley wheels 109 are keyed to the shafts 102 and 107 while the larger pulley wheel 110 is keyed to shaft 105. This shaft 105 is provided with a power wheel 111 rotated by gears or a belt actuated by the wheel 439 as shown in Figure 17. Friction rollers 112 are keyed to the shafts 102 and 107 between one of the plates 101 and the pulley wheels 109. A brake mechanism is provided which cooperates with these friction wheels 112 as disclosed more clearly in Figure 25. The brake arm 113 of the brake mechanism is pivotally mounted upon one of the plates 101 and is situated so that its free end will bear against the friction roller 112. A leaf spring 114 is fixed to the brake arm 113 adjacent its fulcrum and extends at an angle upwardly therefrom. A screw 115 which is threadedly mounted in a bracket 116 (see Figure 29), bears against each of the leaf springs 114 and thus regulates the tension of the friction with which the brake arms 113 bear against the friction wheels 112. A suitable belt 117 extends around the pulley wheels 109 and 110 and an idler mechanism is provided therefor. This idler mechanism consists of an idler supporting frame 118 (see Figure 31) which is pivotally mounted between the lower portions of the plates 101. This idler supporting frame 118 consists of a pair of spaced parallel arms which converge toward their free ends and are curved upwardly for supporting a bearing plate 119. Between the two arms forming the frame 118 an idler roller 120 is mounted under which will pass the belt 117. A leaf spring 121 engages the free end of the frame 118 and normally holds the same upwardly. In order to place the proper tension upon this idler mechanism a screw 122 mounted in the support 123 is adapted to bear against the bearing plate 119 so that any slack which may exist in the belt 117 may be compensated for in a manner which is quite evident from a consideration of the drawing. This mechanism just described retains the record sheet 100 in a taut condition at all times during its operation As has been stated the rollers 103 and 108 are similarly constructed and by referring to Figures 26 to 28 inclusive it will be seen that these rollers may be easily detached from the shafts 103 and 108. As will be explained later it is often advisable to use record sheets of different widths and when so doing it is advisable to provide rollers of equal width to the sheets being used. A plate 124 is attached to the outer end of the roller 108 or 103 and is provided with a rectangular opening 125. A screw threaded tenent is mounted in the end of the shaft 103 or 108 as is shown at 126 in Figure 27 and is received in the opening 125 thus keying the shaft and the spool together. This tenent is adapted to receive a thumb screw 127 when tightened will securely hold the roller 103 or 108 keyed to the shaft 102 or 107.

As has been seen the record sheet 100 passes over the table 104 and it should be noted that this table 104 is beveled at the end adjacent the roller 103 so that the record sheet may pass easily thereover as the same is unwinding from the roller 103. The construction of this table is shown to advantage in Figures 33 to 36 inclusive. A series of dies 130 are arranged transversely across the table 104 for receiving the punches 221 of the punching mechanism which has been heretofore described. To the rear of these dies 130 there is arranged a series of contacts 131 and by referring to Figure 36 it will be seen that each of these contacts 131 is formed from a bolt having the threaded shank 132 which extends through the table 104. The head 133 of each contact is beveled and is suitably embedded in the top portion of the table 104 while the threaded end of the shank 132 terminates in a groove 134 in the bottom portion of the table 104. A suitable nut 135 is threaded on the shank 132 so as to hold the wires 12. A platform 136 is disposed above the table 104 supported by one of the plates 101. A plurality of spring pressed contacts are mounted in this platform 136 so as to extend transversely across the record sheet 100 and these spring pressed contacts are adapted to engage the contacts on the platform 104, through suitable perforations in the record sheet 100. Referring to Figure 32 it will be noted that each of these spring pressed contacts consists of a plunger 137 slidably mounted in plates 138 and 139 so as to extend through an opening in the platform 136 indicated by the numeral 140. At the lower end of the plunger 137 there is mounted a roller 141 which engages the contacts 131 whenever perforations of the record sheet 100 register therewith. This roller 141 is normally held in engagement with the record sheet 100 by means of an expansion coil spring 142 which is disposed around the plunger 137 between the plates 138 and 139. These coil springs 142 bear against the plate 138 and against a suitable stop 143 fixed to the plungers 137. It will be understood that the table 104 and platform 136 are formed from insulating material. A suitable contact connection for a wire is positioned on the plate 138 as shown at 144 and it will therefore be seen that a circuit may be closed, the purpose of which will be hereinafter set forth, when the roller 141 contacts with the contact 131.

The various circuits which may be closed by the mechanism just described will accomplish all the movements required to punch the different classes of work but there are some classes of work which would require only a few of these keys, for instance, a spacing table may be designed to punch only angle bars, flat bars, I beams and similar work. For such work only a few circuits would be necessary and it is therefore more economical to use a few of these circuit closing devices just described. Solenoids 145 are not intended to hold up plungers 137 that are not in use and to keep them in an inoperative position. The circuits are rendered inoperative by withdrawing circuit closing pins 256 from their respective contacts at circuit changing mechanism 14, and by inserting closing pins 256 in only such contacts as are to be operated as will be described.

Contacts 131 and 141 close a circuit for stopping the spacing table and operating the punch press when a hole is to be punched. It is therefore evident that the spacing table would remain stopped and that the punch press would continue in operation as long as contacts 131 and 141 remained closed, providing the means for starting the spacing table would not overcome the means for stopping same. It can be seen that there would be two opposing forces brought in play and that the mechanism would go wild. For this reason solenoids 145 are placed above each of the plungers 137 so that contacts 131 and 141 can be thrown out momently or until spacing table has resumed operation. Solenoids 145 are therefore energized by automatic switch 257 and should be connected by wire 86 leading from that switch. It would work in this way after the hole is punched and the plunger on punch press ascends, automatic switch 257 is operated, current passes through wire 86. Solenoid 145 and plunger 137 would be raised and circuit at contacts 131 and 141 would be broken. Plunger 137, after spacing table had resumed operation, would immediately drop to position and would again be engaged with record sheet 100.

The different circuits closed by the circuit closing mechanism just described will be designated by the numerals 1 to 5 which represent circuits for operating punches of different sizes and letters A to I inclusive the purpose of which will later appear, (see Figure 1).

Attention is now called to Figures 40 to 44 inclusive. In Figure 40 there is disclosed what is known as a narrow record sheet 100 which would be used for spacing angle bars when a single line of holes are to be punched in each leg. In Figure 42 there is disclosed a gusset plate such as is used in steel structural work and in Figure 41 there is disclosed a record sheet made especially to punch the holes in the gusset plate shown in Figure 42. The numerals on the gusset plate in Figure 42 indicate the order in which the various holes are punched. The record sheet disclosed in Figure 41 is traveling to the right as disclosed by the arrow and circuits G and H are the first to be closed. Circuit G sets the spacing table to travel to the right and the circuit H punches the first hole. The spacer will now travel to the right one inch and hole number two is punched. The spacer continues to the right and hole number three is punched. The circuit G is then thrown out by a circuit E while circuit B is thrown in or closed. The spacing table stops traveling to the right and travels "in" three inches and punches hole number four. Circuit G is again closed, circuit B remaining closed, the spacing table travels "in" one inch and to the right one inch and punches hole number five. Circuit C will throw out circuit B and circuit E throws circuit D "out" so that the spacing table travels "out" two inches and punches hole number six. The spacing table now continues "out" and punches hole number seven and the plate is completed. The operation of the circuits will be more clearly understood later.

It can be seen by the illustration just described, that plates of various shapes can be spaced by this method. The table can be made to travel in eight different directions, namely, from right to left, from left to right, "in" which is from you when facing the machine, "out" which is toward you when standing in front of the machine, to the right and "in" at an angle of forty five degrees, to the right and "out" at an angle of forty five degrees, to the left and "in" at an angle of forty five degrees, to the left and "out" at an angle of forty five degrees. For instance, when circuits B and G are closed, the table will travel to the right and at the same time travel "in" thus moving at an angle of forty five degrees. The table moves at the same rate of speed in all directions which is necessary for correct spacing.

Referring to Figures 43 and 44 and assuming that there are four different sized punches which are set in the punch press at two inch center, of course, these punches can be replaced by any sized punches desired and punches are set at different centers on different presses. Some presses now in use are adjustable. Some have two punches while others have many. It must be known at just what centers punches are set in order to make record sheets. It is assumed in the following illustration that the punches are set at two inch intervals. If it is desired to punch a bar with four different sized holes as is shown in Figure 44 and spaced as shown, a record sheet like the one illustrated in Figure 43 would be used. Note that these holes in the bar disclosed in Figure 44 will be punched in the order as is shown from left to right beginning with the second hole. The nine sixteenth inch hole is the first hole punched and is operated by the closing of circuit H. The eleven sixteenth inch hole is the second hole punched and is operated by the closing of circuit three. It will be noted that the nine sixteeth inch hole and the eleven sixteenth inch hole are spaced one and one half inches from center to center and punches are set at two inch centers hence the bar will travel just one half inch. The thirteen sixteenth inch hole is the third hole punched through circuit 2. It will be noted that the nine sixteenth inch hole is three inches separated from the thirteen sixteenth inch hole measuring from center to center, hence the bar travels one more half inch or a total of one inch. The fifteen sixteenth inch hole is the fourth punched. The nine sixteenth inch hole and the fifteen sixteenth inch hole are four and one half inches center to center, hence the bar travels one more half inch or a total of one and one half inches. The last punch is operated through the circuit 1. The nine sixteenth inch hole which was the first punched and the nine sixteenth inch hole to the extreme left are two inches center to center, hence the bar travels one more half inch or a total of two inches and the circuit H operates this punch which is the regular punch in this particular illustration.

In this illustration both the record sheet and the bar travel in the same direction, to the right, but should the record sheet and the bar be reversed and travel in the opposite direction, to the left, the result would be the same. Each hole will be punched in the proper place only the order in which they are punched would be reversed.

It will be noted that the record sheet shown in Figure 43 is wider than is necessary to do the work for which it is made. A record sheet of sufficient width to close four circuits is all that will be necessary to punch the bar shown in Figure 44.

Referring to Figures 45 and 50 it will be noted that a circuit changing mechanism 13 has been disclosed which consists of the rectangular frame 245 having a top portion 246 and a bottom portion 247. Between the portions 246 and 247 there are located the bars 248 and bars 249. The bars 248 are individually designated $1^a$ to $5^a$ and $A^a$ to $I^a$ et cetera. These bars extend at right angles to each other and are separated from each other by means of the insulating strip or plate 252. The bars 249 are provided with terminals 250 extending through the bottom portion 247 while the other bars 248 are provided with terminals 251. Each bar 248 is provided with a plurality of apertures 253 and each bar 249 is provided with a plurality of apertures 254. One aperture 253 of each bar 248 will register with an aperture 254 in each of bars 249.

The bar 248 designated $1^a$ is adapted to be electrically connected with the circuit closing means operated by key 210 designated by the numeral 1 on its finger plate 213 as is shown in Figure 19, while bar 249 designated by the numeral $1^b$ is electrically connected with one of magnets 223 designated individually by numeral $1^c$ in Figure 51. These numerals 1 to 5 and letters A to I may thus be followed through the entire system as will be more clearly understood as the description proceeds. The top portion 246 and bottom portion 247 are provided with apertures 250 which register with the apertures 253 and 254 so that the circuit closing pins 256 may be inserted therein for electrically connecting the various bars 248 with bars 249. It will of course be understood that the frame 245 and bottom 247 and top 246 are formed of insulating material. As is shown in Figure 45 the bars 248 designated individually as $1^a$ to $5^a$ and $A^a$ to $I^a$ are electrically connected with bars 249 individually designated $1^b$ to $5^b$ and $A^b$ to $I^b$ in the order mentioned by the pin 256 and thus the circuit closing mechanism operated by the corresponding keys 210 and the corresponding circuit closing mechanism will close the circuits energizing the corresponding magnets 223. The purpose of this circuit changing device is to transfer the circuits leading to various magnets 223 to any of the keys 210 so that a comparatively narrow record sheet may be used such as is disclosed in Figure 44 for certain comparatively simple structural steel work.

Referring to Figures 51 to 53 inclusive it will be seen that there is disclosed a switch operating mechanism 14 comprising several magnets for closing certain switches whereby various operating mechanisms for the spacing table and punches may be placed in motion or stopped as may be desired and as will be more clearly brought out hereafter. This switch operating mechanism 14 comprises the board 222 which may be of any preferred construction and has mounted thereon a plurality of solenoids 223 which are numbered and lettered similar to keys 210 being distinguished therefrom by the addition of the small letter "c." These solenoids 223 are energized through a circuit closed by the keys 210 or through the contacts 131 and 141. Thus by pressing downwardly on key 210 designated by the numeral 1 the solenoid $1^c$ will be energized. Each of these solenoids 223 operate a switch mechanism. Each switch mechanism will be designated generally by the numeral 224 and consists of the U-shaped bracket 225 having the perforated upstanding members through which pass the plunger 226 having a head at one end 227 which is attracted by the solenoid 223 adjacent it. A switch lever 228 is pivotally attached to the head 227 by means of a pin 229 which slides in a slot provided in the switch arm 228. A coil spring 230 is disposed on the plunger 226 between the upstanding members of the bracket 225 and has one end thereof attached to the plunger and the other end thereof engaging one of the upstanding members of the bracket so that the plunger may be normally positioned as shown in Figure 51. A pair of spaced contacts 231 are adapted to be engaged by the switch arms 228 when same is operated by the magnet 223. Thus the switches 224 will close the circuits for a purpose to be hereinafter more fully explained. It will be noted that these magnets are preferably arranged in two rows and that the magnets $F^c$ and $G^c$ are opposite each other and magnets $A^c$ and $B^c$ are diagonally opposite each other. The switch arms 228 on the switches 224 opposite the magnets $F^c$ and $G^c$ are connected by a rod 232 having a slot at each end for receiving a pin which projects upwardly from these switch arms. A switch arm 233 is actuated by the rod 232. This switch arm 233 is pivotally mounted on the plate 222 by means of a pin 234 (see Figure 52) and is provided with an enlargement at one end having upstanding pins projecting therefrom which are engageable with a T-shaped armature 236 operable by the solenoid FG. The switch arm 233 when pulled to either side by the rod 232 will engage either contact points 237 or 238. No wires are disclosed in Figure 51 since the wiring of this switch operating board is clearly disclosed in Figure 1 of the drawing. Solenoid BC and the switch operated thereby is of similar construction to the solenoid FG and the switch actuated thereby. The switch arm 239 of this latter switch is engageable with the contacts 240 and 241.

As is shown in Figure 51 the solenoid $D^c$ has just been energized and the rod 232' has been pulled to the left thus connecting the contacts 241 with the switch arm 239 and it will therefore be seen (see Figure 1) that the circuits heretofore closed by the contacts 231 and switch arm 228 opposite solenoid $B^c$ will continue to be closed through contacts 241 and the switch arm 239 until solenoid $A^c$ is energized. The solenoid FG is de-energized upon energization of the solenoid $A^c$ as will be evident from an inspection of Figure 1 and Figure 51. The solenoid BC is de-energized through the energization of solenoid $E^c$.

Referring especially to Figures 54 to 57 inclusive it will be seen that an automatic switch has been disclosed which will be placed on the head of the punch press. The bar 260 of this switch 257 will be connected with the top of the plunger in such a way that the bar will be raised when the plunger ascends after the hole is punched in the work. There is a slide 258 situated on the bar 259. This slide 258 crosses bar 259 at an angle of about forty five degrees. On the bar 260 there is situated a small slide 261. When the bar 260 is lifted the slide 261 forces the slide 258 and bar 250 out so as to electrically connect the contacts 262 and 263. As the slide 261 passes out of reach of slide 258 the bar 259 is immediately forced by spring 264 back in place and the switch is thrown to an open position when spring 265 forces the bar 260 back into place. The spring 264 is not so strong and will permit the bar 259 to pass back to let the slides 258 and 261 to pass each other, then it forces the bar 259 in its proper place. The bars 260 and 259 are slidably mounted between the spaced triangular blocks 266. The automatic switch 257 is connected by wire 86' (Figure 1) with contacts 237, 238, 240 and 241. Whichever one of these contacts are closed, either by switch arm 236 or 239, will operate the means that was operated by the initial action of either of the magnets $F^c$, $G^c$ $B^c$ and $C^c$. This will be more easily understood in conjunction with the detailed description of Figure 1.

In Figure 58 there is disclosed a switch board 258 which may be of any preferred construction and is to be used by the operator when it is desired to operate the spacing table, either to stop, start, or bring into a certain position without the use of the record sheet or keys 210, since if keys 210 are used, apertures will be punched in the record sheet which could not be used there-afterwards.

In Figures 59 to 62 inclusive there is disclosed a mechanism for controlling the gags at the punch press. In Figure 59 there is illustrated the manner in which the cylinders 277 are attached to the plate 269. This plate 269 is to be fastened to the lower parts of the plunger on punch press, just below the gags, so that the piston rods 270 will be in alignment with the gags. The gags are not shown and may be of any conventional construction so as to operate with the mechanism now being described as will be evident to those skilled in the art. In Figure 61 there is disclosed the body 271 of cylinders 277. This body 271 is provided with the air supply conduits 272 and 273, also exhaust conduits 274. The key 275 which is illustrated in detail in Figure 62 is provided with a body 276. The shank of this key 275 is provided with the main conduits 281 and the right angularly extending exhaust conduits 282. This exhaust conduit 282 will register with the exhaust conduits 274 and conduit 273 when the key 275 is in the position as shown in Figures 59 and 60. When the key 275 is raised upon energization of one of the solenoids 280 the main conduit 281 will register with the conduit 273 thus allowing air to be delivered to the cylinders 277. The compressed air is supplied through the conduits 272 and 273 into cylinder 277 thus forcing the piston rod 270 out or upwardly as shown in the drawing and the gag being attached to the end of this piston rod will be placed in position and that particular punch will be actuated. As soon as the hole is punched the gag is released and spring 278 will withdraw the rod 270 and the corresponding gag. A spring 279 is provided on key 275 and this spring will be of a delicate nature adapted to pull key back in place as soon as magnet 280 is de-energized. The solenoids 280 should be marked $H^d$, $1^d$, et cetera, corresponding to the indices on keys 210. There are three solenoids shown in Figure 59. The number of solenoids 280 will be governed by the number of punches used on the punch press.

In Figures 63 to 69 there is disclosed a distance determining mechanism which will operate certain solenoids on the switch operating board 14 when it has traveled a given distance. The mechanism is a circuit closer which, when it has made a certain number of revolutions or a fraction of a revolution, will close a certain circuit thus operating certain solenoids. The disks 355, 356, 357 and 358 are mounted on shaft 351, the disk 357 being keyed to this shaft while the others rotate independently thereof. The disk 357 is provided with a small gear 359 on one side and a larger gear 360 upon its other side, these gears being fixed so as to rotate with the disk 357. The gear 359 is in mesh with the gear 390 which is keyed to a shaft extending through the standard 354 and provided at its other end with a keyed gear 371 which is in mesh with a larger gear 372 fixed to disk 356. Upon the other side of this disk 356 there is fixed smaller gear 373 which is in mesh with a larger gear 374 keyed to a shaft extending through the standard 354 which shaft is provided upon its other side with a smaller gear 375 which is in mesh with a gear wheel 376 fixed to disk 355. The gear 360 is in mesh with a much smaller gear 377 which is keyed to a shaft passing through one of the standards 354 having upon its other end a larger gear 378 in mesh with a gear 379 fixed to the disk 358. By this system of gearing the disk 355 will make one revolution while disk 356 makes ten revolutions. While disk 356 makes one revolution, the disk 357 makes ten revolutions. While disk 357 makes one revolution the disk 358 makes twelve revolutions. The disk 358 makes one revolution for each inch traveled by the work table and consequently disk 357 makes one revolution for each foot of the travel of the spacing table et cetera. It will therefore be seen that the shaft 351 makes one revolution for each foot traveled by the spacing table and the disk 357 is keyed thereto while the disks 355, 356, and 358 are loosely mounted upon this shaft so as to rotate independently thereof. Of course, there are other systems of gearing which may be readily constructed for accomplishing the same purpose as outlined in the present instance and it is, therefore, not desired to be in any way held to the specific construction herein disclosed. A certain point is selected on the rim of each disk 355, 356, 357, and 358 to close a circuit and each disk must be set in a certain position for this purpose which is the starting point or until every disk has returned to the starting point the circuit is broken. For instance, if the device is set at ten feet the wheel 358 will have made one hundred and twenty revolutions, wheel 357 ten revolutions, wheel 356 one revolution, and wheel 355 one tenth revolution to travel. The spacing table will then travel ten feet by the operator touching either key B, C, F, or G and the disks 355, 356, 357, and 358 reverse so as to turn to the starting points. When the circuit is closed the current will pass through magnet $I^c$ at the switch board 14, thus stopping the spacing table and the record sheet operating mechanism. The operator then touches the key which operates the punch press punching the hole required and proceeds by setting the distance record mechanism at whatever space required repeating the operation as described above as often as is necessary. It will be noted that whatever space the distance record mechanism is set, whether it be a fraction of an inch or ninety feet, a circuit will not be closed until the space has been actually traveled by the spacing table and all the disks returned to their starting points. For instance, if the distance record mechanism is set at ten feet and only nine feet have been covered, disk 355 will still have one hundredth of a revolution to move, disk 356 one tenth revolution, disk 357 one revolution, and disk 358 twelve revolutions, before all the disks will place the necessary contacts in alignment with each other so as to close a circuit. In this particular example the circuit closing contacts on wheels 357 and 358 will be electrically connected but disks 355 would be one hundredth and disk 356 one tenth revolution away from the starting point and a complete circuit would not be made. A circuit is never made until each disk has returned to its starting point. Of course, it is readily understood that should a greater total be required than the disks would furnish (which is a fraction less than one hundred feet), an extra wheel would be attached and geared to reduce the speed thereof ten times and the total would then be a fraction less than one thousand feet. The mechanism for starting the distance record mechanism is clearly illustrated to the right of Figure 63 and in Figure 64. The crank 380 is used to start the distance record mechanism. An adjusting plate 381 is provided with thirty two holes 382. This plate 381 is connected with disks 358 by means of a sleeve or hollow shaft 383 mounted on shaft 351 and keyed to disk 358. As the disk 358 makes one revolution for each inch traveled by the spacing table the plate 381 makes one revolution for each inch and each hole 382 in plate 381 is spaced one thirty second of an inch apart. A pin 384 is slidably mounted in the bracket 385 and is adapted to penetrate the holes 382. Thus as this pin is pointed at its end so as to properly center the hole 382 which it penetrates, if the disks 355, 356, 357 and 358 are one hundredth of an inch inaccurately positioned the pin 384 upon entering the proper hole 382 will move these disks to their proper and correct position so as to define an exact measurement. This is accomplished by the operator placing his finger upon plunger 385 slidably mounted in the handle on crank 380. By pressing inwardly upon this plunger 385 the lever 386, fulcrumed to the handle 380 in any suitable manner, will be actuated. The upper end of this lever 386 is bifurcated and in pivotal engagement with the sleeve 387. Another lever 388 is similarly connected to the sleeve 387 at its other end so that when this sleeve is pulled to the right upon actuation of the lever 386 it will actuate the lever 388 which is fulcrumed upon the bracket 385' so as to cause the pin 384 to travel to the left or toward the plate 381 and penetrate one of the holes 382. When this is accomplished the operator releases plunger 385 and spring 389 will withdraw pin 384 from the penetrated hole 382.

The numerals 395, 397, and 398 designate disks which are keyed to gear wheels 376, 372, 360, and disk 358 respectively and are insulated therefrom in any suitable manner. Similar disks 399, 400, 401 and 402 are suitably spaced and insulated from disks 395, 396, 397 and 398. Friction drums 391, 392, 393 and 394 are suitably spaced and insulated from disks 399, 400, 401, and 402 and are keyed thereto. The disks 395, 399, 396, and 400, 397, and 401, and, 398, and 402 although not keyed to one another will normally rotate with each other except when the friction drums are loose as will be hereinafter described. It will be noted that this distance record mechanism can be easily set for any distance within its limit, which is ninety nine feet, eleven and thirty one thirty second inches. If set at three inches the crank 380 would be turned by the operator just one fourth of a revolution. If six inches this crank would be turned one half a revolution, if one inch one complete revolution. The mechanism as here illustrated is set to determine distances as small as one thirty second of an inch and if stopped at one sixty fourth of an inch the pin 384 would hit the plate 381 just midway between the holes 382 and, of course, this would be readily detected by the operator. If it is desired to set the device at one sixty fourth of an inch a plate 381 could be designed graduated with sixty four holes 382 or any suitable manner that may be desired.

Referring especially to Figures 64 to 67 it will be noted that the method is illustrated by which the current is transmitted from the disks 355, 356, 357, and 358 to the solenoid $I^c$ which stops the spacing table. The electrical conductors 405 are disposed on the frame 353 between the disks 355, 356, 357 and 358 and are suitably spaced from each other so that when the lugs 406 are positioned upon each of the disks 355, 356, 357 and 358 engages the same it will cause a circuit to be closed therebetween. The end conductors 406 are provided with suitable terminals 407 for receiving the necessary electrical wire connections. The U-shaped conductor 408 electrically connects the disk 398 with the disk 401, disk 397 with disk 400, disk 396 with disk 399. These U-shaped conductors 408 have their legs bent at 412 so as not to be in electrical engagement with the conductors 405. The conductor 409 is in electrical engagement with the disk 395 and is also curved so as to pass around, without touching, the conductor 405. This conductor 409 is provided with a terminal 411. The conductor 410 is in electrical engagement with the disk 402 and is also provided with a terminal 411. These conductors 405, 408, 409 and 410 are suitably mounted on blocks 413 so as to be insulated from the frame 353.

Referring more especially to Figures 68 to 69, there is disclosed the locking devices which operate upon the friction drums 391. 392, 393 and 394. There are two levers 414 which clamp over the friction drums. These levers 414 are pivotally mounted upon the plate 415 so as to be spaced normally from each other and the curved ends which frictionally engage the friction drums are normally held apart by means of an expansion coil spring 416. A rod 417 passes through the blocks 413 so as to be rotatably mounted therein and a suitable cam 418 is keyed thereto so as to engage the levers 414 and cause the curved portions thereof to frictionally engage the friction drums 391, 392, 393 and 394 thus stopping the rotation of the disks 399, 400, 401, and 402. The object of thus locking these friction drums 391, 392, 393, and 394, when a mechanism is set at a certain desired position the disks 399, 400, 401 and 402 turn with the disks 395, 396, 397 and 398 and their respective disks 355, 356, 357, and 358, but when the locking device is operated, the desired position having been reached, and these members do not move but disks 395, 396, 397 and 398 continue to move. The disks 395, 399, 396, 400, 397, 401, 398, 402 are each provided with a projection 419 so that when these projections meet the disk 402 will be in electrical engagement with the disk 398, disk 401 will be in electrical engagement with disk 397, disk 400 will be in electrical engagement with disk 396 and disk 399 will be in electrical engagement with disk 395. Thus it will be seen that when disks 399, 400, 401, and 402 are locked, a combination has been set and when disks 395, 396, 397 and 398 take a position so that their projections 419 engage the projections 419 on the locked disks a circuit is made and the work table is put in motion as is the operating device which travels back to a starting point so that when the repeating device is used the solenoid D$^c$ is always operated with solenoid I$^c$, and also that solenoids D$^c$, C$^c$, F$^c$, or G$^c$. Note that solenoid B$^c$ reverses the operating device only. The repeating device just described is intended to space a single line of holes of equal spaces. For instance, if a line of holes are required, say, fifty spaces at five one thirty second inches each space, the indicator marked "number of spaces" at 50 in Figure 90, said indicator marked "spacing" at five one thirty second inches and the machine will punch fifty holes and stop. The indicator marked "total" will register twenty feet, ten and nine sixteenth inches, which would be the total length of fifty spaces at five and one thirty second inches. The purpose of this total is to check and make certain that a mistake has not been made. The repeater works in this way. If the device is set at five and one thirty second inches, the device turns back to starting point at the same time the spacing table has traveled just five and one thirty second inches. At this point the solenoid I$^c$ is operated stopping the work table. The solenoid H$^c$ is operated operating the punch press and the hole is punched. The solenoid D$^c$ is operated reversing the operating device which travels back to the combination as set while the hole is being punched. When the combination is reached the solenoids B$^c$, C$^c$, F$^c$, G$^c$ and D$^c$, are operated and spacing table is started again traveling five and one thirty second inches at the same time the operating device has been reversed by solenoid D$^c$ and travels back to the starting point while the work table is traveling five and one thirty second inches, this being repeated until the desired number of holes are punched. Note that magnet I$^c$ is wired to stop both the spacing table and the operating device, and must be shut off or disconnected at operating device, when repeating device is being shown as in this case. This can be done by an ordinary switch (not shown). The operating device must not be stopped but reversed until the last hole is punched. When last hole is punched the solenoid I$^c$ is operated actuating the punch brake on the operating device by a separate wire which is attached to the counting device.

Attention is now called to Figures 70 to 82 inclusive. Referring particularly to Figure 75 it will be noted that there has been disclosed the drums 420, 420', 421, and 422. The drum 420 indicates the space traveled by the spacing table in ten feet, drum 425 in feet, drum 421 in inches, and drum 422 in fractions of an inch. A gear 423 is attached to each of the drums 420, 420', 421 and 422 and is exactly the same diameter as gear 425 on shaft 351 and disclosed in Figure 63. The gears 425 drive the gear 426 which meshes with gear 427 which in turn meshes with the gear 423 on drum 420 (see Figure 70). It will, therefore, be readily seen that drum 420 will revolve so as to make the same number of revolutions as the disk 355. The gear 423 is attached to drum 420' which is geared with the gear 373 in any suitable manner, so that the drum 420' will rotate in unison with disk 356. The drums 421 and 422 are likewise connected with the disks 357 and 358 respectively and it is not thought necessary to go into further detail as these may be suitably geared in any manner which is well within the scope of mechanical skill and will be well understood by referring to the drawings. The numerals on drums 420, 420', 421 and 422 are read through the slot marked "spacing" in Figure 90 and are used when setting the device at any space or spacing. In Figure 77 there is disclosed a plan view of the periphery of drums 420 and 420' as if flattened out. In Figure 78 there is shown a similar view of drum 421 and in Figure 79 a similar view of drum 422. Figure 79 also diagrammatically indicates the manner in which the numerals upon drum 422 should be read. This is done to enable the operator to read the fractions rapidly and easily, which could not be done if they were arranged as inches are arranged on drum 421. Where fractions are indicated or used the particular space registering with drum 422 is provided with the numerals 32, 16, 8, 4, and 2. These numerals below the space indicate the denominator of the fraction and enumerator of the fraction is indicated upon the drum 422. One thirty second would be indicated thus $$\frac{1}{32-16-8-4-2},$$

one sixteenth would be indicated thus $$\frac{1}{16-8-4-2}.$$

This arrangement permits the use of much larger figures than could otherwise be used. If the operator is working in "thirty seconds" he watches the first line, if in "sixteenths" the second line, if in "eighths" the third line, if in "fourths" the fourth line, and if in "halves" the fifth line.

Referring specifically to Figures 80 to 82 it will be seen that there are provided four drums 450, 451, 452 and 453 which are marked similar to drums 420, 420', 421 and 422. These drums are of similar construction except that the drums disclosed in Figure 80 are weighted as is shown at 455 in Figure 74 so that they will be adjusted by gravitation in such a manner that the zero index on each drum will appear through the opening marked "total" in Figure 90. These weights 455 are indicated by the dotted lines in Figure 80 and may be inserted in the drums in any suitable manner as will be well within the scope of mechanical skill. Each of the drums disclosed in Figure 80 is provided with a ratchet wheel. The ratchet wheel 459 attached to drum 453 is provided with thirty two teeth, the ratchet wheel 458 attached to drum 452 is provided with twelve teeth and the ratchet wheel 457 attached to drum 451 is provided with ten teeth and the ratchet wheel 456 attached to drum 450 is provided with ten teeth. Each of the drums disclosed in Figures 75 and 80 are provided with frictional wheels 460, the friction wheel 460 on drum 420 engaging with friction wheel 460 on drum 450 et cetera. Thus the drums 420, 420', 421, and 422 will rotate the drums 450, 451, 452 and 453 in the opposite direction so that the indices placed on the latter are sequenced in an opposite direction from the indices on the former. The drums 420, 420', 421, and 422 and their cooperating parts are mounted on shaft 461 and drums 450, 451, 452 and 453 are mounted on shaft 462. These shafts 461, and 462 are suitably journaled in brackets 463 (see Figure 70).

As has been previously explained the drums 420, 420', 421, and 422 rotate in unison with the disks 355, 356, 357, and 358 respectively so as to indicate the exact space at which the device is set and returned to a starting point with same. The drums 450, 451, 452 and 453 are provided with means so that they will travel in one direction with the drums 420, 420', 421 and 422 being driven thereby through the friction disks 480 but they do not return to the starting point with same as the ratchet wheels 456, 457, 458 and 459 hold them together at each forward movement and a total is obtained, giving the exact number of feet and inches of all the spacing. For instance, if five spaces are made at five inches the opening marked "total" in Figure 90 would register two feet one inch. This is done for checking purposes. When it is desired to adjust the drums 450, 451, 452, and 453, it is done by turning the rod 465 to which are attached the dogs 464 shown in dotted lines in Figure 70. When the rod 465 is turned the dogs 463 disengage with their respective ratchet wheels 456, 457, 458 and 459, these drums 450, 451, 452 and 453 being weighted as explained will rotate by gravitation so that the indices zero will register with the openings marked "total" in Figure 90 or returned to a starting position. When the rod 465 is released the weight of the dogs will cause them to gravitate so as to engage with their respective ratchet wheels. The shafts 462 are not journaled in the bracket 463 but project through the slots 457 and are journaled in arms 468 which are pivotally mounted on these brackets 463 and these arms are normally held upwardly by leaf springs 469 so that the friction wheels 460 will be in engagement with one another. In order to disengage these friction wheels 460 a lever 470 is keyed to the rod 465 so that when the dogs disengage the ratchet wheels this lever 470 will force the arms 468 downwardly. Of course as soon as the rod 465 is released the spring 469 will bear upwardly upon the arms 468 thus reengaging the friction wheels 460 and at the same time forcing levers 470 to rotate rod 465 so that the dogs 464 will engage the respective ratchet wheels 456, 457, 458 and 459.

Attention is now called to Figures 83 to 87 wherein is disclosed a counting mechanism which will count the various spaces between the holes punched in the structural steel or other work upon which the mechanism is operating. This counter is operated by two magnets 470 and 471. A shaft 472 is suitably journaled in brackets and has mounted thereon drums 474, 475, 476 and 477. The drum 477 is keyed to the shaft 472 and always revolves with the same. The other drums 474, 475 and 476 are loosely mounted on the shaft 472 so as to rotate independently thereof. Disposed below the shaft 472 is a bar 478 to which are attached the springs 478' carrying pins 476' projecting through suitable apertures in bar 478 so as to engage indentures 477' in the drums. The drum 474 is provided with a wheel 480 having peripheral notches 481. The drum 475, upon its face adjacent the drum 474 is provided with a circular curved spring 482 which is attached thereto as is shown at 483. Upon the other end of the spring 482 there is provided a head 484 having a slot therein which receives a pin projecting laterally from the drum 475. This head 484 is adapted to engage one of the raised portions 479 and to be forced into one of the peripheral notches 481 in the wheel 480. Upon the other face of this drum 475 there is provided a peripheral notched wheel 480. The drum 476 is provided with one of the springs 482 upon its face adjacent the drum 475 and upon its other face with a peripheral notched wheel 480. The drum 477 is provided with a spring 482 upon its face adjacent drum 476. These various drums 474, 475, 476, 477 being assembled as shown in Figure 83 will operate so that when drums 477 complete one revolution, it will turn wheel 476 one tenth of a revolution through the intermediacy of the peripheral notched wheel 480 and spring 482 engaging therewith because of its abutment with the raised portion 479. The remaining drums 475, and 474 will be actuated likewise as will be evident. A coil spring (not shown) will be disposed about the shaft 472 so as to cause these drums 474, 475, 476, and 477 to remain adjacent each other so that the springs 472 will cooperate with the peripheral notched wheels 480. This spring will permit the drums to be separated so as to be adjusted to the starting point when so desired. This only needs to be done when a larger number has been counted as it would then be required to make too many turns of the shaft 472 to adjust the counting device. When a hundred or so has been counted the operator can easily adjust the shaft by means of a few turns thereof, a thumb piece being provided upon the end thereof for this purpose. Note that there are two solenoids 470 and 471 which operate this counting device and these solenoids are operated by the same circuits that operate the punch press so that the counter will be actuated upon each hole being made thereby so as to accurately count the spaces therebetween.

In Figure 83 there is disclosed a front view of these magnets while in Figure 84 there is disclosed a side view thereof. The top magnet 470 will operate the counter to go forwardly and counts from one to nine thousand nine hundred and ninety nine. The lower magnet 471 operates the counter backwardly for any number at which it might be set to zero. This is done when the repeater is used.

When the spacing appliance is set to punch a single line of holes the repeater is used as previously described. Should the operator want fifty spaces punched he would set the counter at 50 and switch the current from solenoid 470 to solenoid 471 by means of any ordinary switch, then the counter would work backwardly and return to zero. This counter is provided with an electrical attachment (not shown) similar to that disclosed in connection with disks 355, 356, 357, and 358 which will operate magnet I$^c$ as is done by the disks just mentioned. It must be remembered that when the repeater is used, the solenoid 36 at clutch 300, (see Figs. 1$^b$ and 17), which starts the operating device, is operated by a separate circuit from disks 355, 356, 357 and 358. The solenoids at the other clutches are not operated. When the punching has been accomplished the solenoid I$^c$ at the switch board operates all stopping means thus stopping all movement until the operation is completed. So when the counter returns to zero the solenoid I$^c$ at the switch board is operated and the machine is stopped when the fifty spaces are punched. When a number of pieces are to be punched with the repeater the counter wants to be reset for each piece but that only requires a fraction of a minute.

The solenoids 470 and 471 turn shaft 472 by a mechanism consisting of two ratchet wheels 491 with ten teeth each. A steel body 493 having a metallic shank 494 provided with a pivotal dog 495 which is normally in engagement with the ratchet wheel 491 by means of the spring 496. This steel body 493 is provided with an armature head 492 which is attracted by the respective magnets 471 and 470. Thus it will be seen that upon each energization of one of the magnets 470 or 471 the shaft 472 will make a one tenth revolution.

The spacing bill 327 which is shown in detail in Figure 2$^a$ passes through slot 329 shown in Figure 90 over roller 449 mounted on shaft 498. In order to operate this roller in unison with the mechanism just described in order that the spacing bill may be gradually fed so as to be seen through the opening 330 shown in Figure 91, a belt 501 passes over pulley wheel 500 and over a pulley wheel 497 provided on the roller 449. This belt 501 also passes over idler pulleys 502. The spacing bill 327 is divided into columns corresponding with the keys 210.

In Figures 88 to 91 there is shown the general construction of the operator's machine which contains the various mechanism which has been described. The entire spacing appliance is controlled by the mechanism contained within the casing 324 which is so constructed that the top portion thereof is hinged so as to be lifted in order that easy access may be had to the working parts contained therein.

Referring especially to Figures 88 to 89 it will be seen that the shaft 527 which is driven by the operating mechanism disclosed in Figure 17 is provided with the gear 528 meshing with gears 350 and 111. The gears 350 rotate the shaft 351 through the clutch 325 which is operated by lever 529. The gear wheel 111 rotates the shaft 105 through the clutch 526 controllable through lever 530. The purpose of clutch 525 is to throw out the counting mechanism after the record sheet has been made. The remaining pieces of work will be punched automatically with the record sheet. The clutch 526 will only be used when found necessary.

The alternating switch indicated generally by the numeral 56 is mounted in any suitable casing from which extends the wire 800 to which is attached the wires 55 and 93. The current passes through the wire 800, through the electro-magnet 801, through the wire 802, to the switch proper. The switch as shown to advantage in Figure 94 comprises the shaft 803 to which is keyed the disk conductors 804 and 805 which are suitably insulated from each other by the insulation 806. The shaft 803 passes through a plate 807 to which are attached the conductor rings 808, 809, and 810 which are suitably insulated from each other and it is to be noted that the ring 809 is twice as thick as either of the rings 808 or 810. As shown to advantage in Figure 95 each of the contact rings 808, 809, and 810 are provided with a contact strip 811. The representation in Figure 95 is the same for all three of these contact rings. As will be noted in Figure 94 the disks 804 and 805 are provided with contacts 812 which are arranged alternately and are adapted to be engaged by the contact strips 811. Thus the current passes from the wire 808 which is connected to the ring 809, through this ring, through the contact 811 on either of the rings 808, or 810 depending on which of the contacts 811 is in engagement therewith as will readily understood. Thus it will be seen that as the shaft 803 is rotated the current will pass alternately through the switch to the wires 57 and 58 for a purpose to be set forth later. This shaft 803 is rotated by the mechanism consisting of a ratchet wheel 813 which is keyed to the shaft and engages the pivotally mounted dog 814 mounted on the bar 815 slidably mounted in brackets 816. This bar is attracted by the electro-magnet 801 and after this electro-magnet is de-energized the spring 817 returns the bar and actuates the ratchet wheel and shaft so as to change the switch as should be now quite evident.

The detailed descriptions of the various mechanisms used in the present apparatus have proceeded sufficiently to now comprehend the general operation of the system as a whole when the same is used in connection with the record sheet 100. Figure 1, shown on three separate sheets of the drawing, when taken together, forms a diagram of this system and it will be noted that the numeral 100 indicates the record sheet which operates to close the circuit closers 10 which are in electrical communication with the circuit changing mechanism 13 through the wire 12. This circuit changing mechanism 13 is electrically connected to the switch operating mechanism 14 through the wires 15. Each circuit closer 10 is designated by an individual numeral or letter or both and will be hereinafter referred to by these specific designations.

If the circuit closer 1 is allowed to be closed by the record sheet the current is passed from the source of electrical energy 11, through wire 18, through wire 19, through circuit closer 1, through wire 12, through circuit changing board 13, through wire 15, through solenoid $1^c$, and returns through wire 56, through wire 16, through wire 17, to the source of electrical energy 11. This circuit just described will energize the solenoid $1^c$ and thus the switch 224 opposite it will be closed, so that the current is passed from the source of electrical energy 20, through wire 21, through wire 22, through wire 23, through switch 224, through wire 26, through solenoid $1^g$, through wire 27, through solenoid P, through wire 28, through solenoid BR, through wire 32, through solenoid BRA, through wire 33, through switch 34, through wire 35, through solenoid 36 and is grounded at 37.

If the circuit closer 2 is allowed to close the current passes from the source of electrical energy 11 through wire 18, through wire 19, through circuit closer 2, through bar $2^a$, through peg 256, through bar $2^b$, through wire 15, through solenoid $2^c$, and returned through wire 56, through wire 16, through wire 17 to the source of electrical energy 11. This circuit just described will energize the solenoid $2^c$ and thus the switch 224 opposite it is closed whereby another circuit will be formed. The circuit closed by the switch 224 opposite the solenoid $2^c$ allows the current to pass from the source of electrical energy 20, through wire 21, through wire 22, through the switch 224 opposite the solenoid $2^c$, through wire 38, through solenoid $2^d$, through wire 27, through solenoid P, through wire 28 and the remaining portion of the circuit is the same as that previously described in connection with circuit closer 1.

Upon closing the circuit closer 3 the current passes from the source of electrical energy 11, through wire 18, through wire 19, through circuit closer 3, through bar $3^a$, through plug 256, through bar $3^b$, through wire 15, through solenoid $3^c$, and returns through wire 56, wire 16, and wire 17 to the source of electrical energy 11. This circuit thus energizes the solenoid $3^c$ and closes the switch 224 opposite it which forms a circuit whereby the current passes from the source of electrical energy 20, through the wire 21, through the wire 22, through switch 224 opposite the solenoid $3^c$, through wire 39, through the solenoid $3^d$, through the wire 27, through the solenoid P, through the wire 28 and remaining portion of this circuit is the same as that described in the similar circuits in connection with circuit closers 1 and 2.

Upon closing the circuit closer 4 the current passes from the source of electrical energy 11, through wire 18, through wire 19, through circuit closer 4, through bar $4^a$, through plug 256, through bar $4^b$, through wire 15, through solenoid $4^c$, and returns through wire 56, wire 16, wire 17 to the source of electrical energy 11. This circuit thus energizes the solenoid $4^c$ thereby closing the switch 224 opposite it which causes to be formed another circuit whereby the current passes from the source of electrical energy 20, through wire 21, through wire 22, through switch 224 opposite the solenoid $4^c$, through wire 40, through solenoid $4^d$, through wire 27, through solenoid P, through wire 28, and the remaining portion of this circuit is the same as that described in connection with the closing of circuit closers 1, 2 and 3.

Upon the closing of the circuit closer 5, the current passes from the source of electrical energy 11, through wire 18, wire 19, circuit closer 5, bar $5^a$, plug 256, bar $5^d$, wire 15, solenoid $5^c$, and returns through the wire 16, and wire 17 to the source of electrical energy 11. This circuit thus energizes the solenoid $5^c$ whereby the switch 224 opposite it is closed and thus completes a circuits whereby the current passes from the source of electrical energy 20, through wire 21, through wire 22, through wire 23, through the switch 224 opposite the solenoid $5^c$, through the wire 41, through solenoid $5^d$, through wire 27, through solenoid P, through wire 28 and the remaining portion of this circuit is the same as that described in connection with the circuit closers 1, 2, 3 and 4.

Upon closing the circuit closer H the current passes from the source of electrical energy 11, through wire 18, wire 19, circuit closer H, bar $H^a$, plug 256, bar $H^b$, wire 15, solenoid $H^c$ and returns through wire 56, and wire 17 to the source of electrical energy 11. This circuit thus energizes the solenoid $H^c$ thereby closing the switch 224 opposite it whereby a circuit is closed so that the current passes from the source of electrical energy 20, through wire 21, through wire 25, through the switch 224 opposite the solenoid $H^c$, through wire 42, through solenoid $H^d$, through wire 27, through solenoid P, through wire 28, and the remaining portion of this circuit is the same as that described in the closing of circuit closers 1, 2, 3, 4 and 5.

Upon the closing of circuit closer A the current passes from the source of electrical energy 11, through wire 18, through wire 19, through circuit closer A, through bar $A^a$, through plug 256, through bar $A^b$, through wire 15, through solenoid $A^c$, through wire 43, through solenoid BC, and returned through wire 44, and through wire 17 to the source of electrical energy 11. The energization of solenoid $A^c$ causes the switch 224 opposite it to be closed whereby a circuit is closed so that the current passes from the source of electrical energy 20, through wire 21, through wire 25, through switch 224 opposite solenoid $A^c$, through wire 45, through solenoid K which is grounded. It should also be noted that the circuit formed upon the closing of circuit closer A causes the solenoid BC to be energized whereby the switch 239 is placed in an open position for a purpose which will be more fully explained elsewhere.

Upon the closing of the circuit closer E the current passes from the source of electrical energy 11, through wire 18, through wire 19, through circuit closer E, through bar $E^a$, through plug 256, through bar $E^b$, through wire 15, through solenoid $E^c$, through wire 46, through solenoid FG and returned through wire 49 and wire 17 to the source of electrical energy 11. This circuit energizes both solenoids $E^c$ and FG. The solenoid $E^c$ closes the switch opposite it 224 whereby a circuit is formed so that the current passes from the source of electrical energy 20, through wire 21, through wire 25, through switch 224 opposite solenoid $E^c$, through wire 50, through solenoid K' which is grounded. The energization of the solenoid FG causes the switch 233 to take or remain in an open position for a purpose which is explained elsewhere.

By closing the circuit closer I the current passes from the source of electrical energy 11, through wire 18, through wire 19, through circuit closer I, through $I^a$, through plug 256, through bar $I^b$, through wire 15, through solenoid $I^c$, through wire 56, and returns through wire 17 to the source of electrical energy 11. This circuit energizes the solenoid $I^c$, thereby closing the switch 224 opposite it so as to form a circuit whereby the current passes from the source of electrical energy 20, through wire 21, through wire 25, through switch 224 opposite the solenoid $I^c$, through wire 51, through wire 28, through solenoid BR, through wire 32, through solenoid BRA, and returned through wire 33, switch 34, wire 35, through solenoid 36 which is grounded at 37.

Upon the closing of the circuit closer D the current passes from the source of electrical energy 11, through wires 18 and 19, through circuit closer D, through bar $D^a$, through plug 256, through bar $D^b$, through wire 15, through solenoid $D^c$ and returns through wire 56, and wire 17 to the source of electrical energy 11. This circuit energizes the solenoid $D^c$ thereby closing the switch 224 opposite it whereby a circuit is formed so that the current passes from the source of electrical energy 20, through wire 21, through wire 25, through switch 224 opposite solenoid $D^c$, through wire 55, through alternating switch 56 and passes alternately through the wires 57 and 58 to the solenoids 59 and 60 which are grounded.

Upon closing the circuit closer G, the current passes from the source of electrical energy 11, through wires 18 and 19, through circuit closer G, through wire 12, through bar $G^a$, through plug 256, through bar $G^b$, through wire 15, through solenoid $G^c$, and returned through wire 56 and wire 17 to the source of electrical energy 11. This circuit thus energizes the solenoid $G^c$ whereby the switch opposite it 224 is closed so that the current passes from the source of electrical energy 20, through wire 21, through wire 25, through switch 224 opposite solenoid $G^c$, through wire 61, through solenoid M', through wire 63, through solenoid CLU, through wire 62, through wire 64, through solenoid 65 which is grounded. This current from the wire 62 also passes through the switch 66 either through wire 57 to the solenoid 68 which is grounded or through wire 69 to the solenoid 70 which is grounded. It will also be noted that upon energization of the solenoid $G^c$ the switch 233 will be placed in a position so as to span the contact points 237 whereby a current from the wire 71 passes through the wire 72, wire 73, and wire 74 to the wire 61 for a purpose which is explained elsewhere.

Upon the closing of circuit closer F the current passes from the source of electrical energy 11, through wires 18 and 19, through circuit closer F, through bar $F^a$, through plug 256, through bar $F^b$, through wire 15, through solenoid $F^c$, and returns through wire 56, wire 16 and wire 17 to the source of electrical energy 11. This causes the energization of the solenoid $F^c$ whereby the switch opposite it 224 is closed so as to allow the current to pass from the source of electrical energy 20 through wire 21, through wire 22, through wire 23, through switch 224 opposite solenoid $F^c$, through wire 75, through solenoid L', through wire 76, through solenoid CLU and through wire 62 continuing the circuit as described in connection with the circuit closer G. The energization of the solenoid $F^c$ causes the switch 233 to span the contact points 238 whereby a current passes from the wire 71, through wire 72, through wire 77 to wire 75. The purpose of this circuit is explained elsewhere.

Upon the closing of the circuit closer C the current passes from the source of electrical energy 11, through wires 18 and 19, through circuit closer C, through bar $C^a$, through plug 256, through bar $C^b$, through wire 15, through solenoid $C^c$, and returns through wire 56 and wire 17 to the source of electrical energy. This energization of the solenoid $C^c$ closes the switch 224 opposite it thereby allowing current to pass from the source of electrical energy 20, through wire 21, through switch 224 opposite the solenoid $C^c$, through wire 80, through solenoid M, through wire 81, through wire 82, through solenoid CL, through wire 83 to wire 62 and the remaining portion of this circuit it will be seen is the same as that described in connection with circuit closers D and F. The energization of solenoid $C^c$ also causes the switch 239 to span the contact points 290 whereby the current from the wire 71 passes through wire 84, wire 85 to wire 80. The purpose of this current is explained elsewhere.

Upon the closing of the circuit closer B the current passes from the source of electrical energy 11, through wires 18 and 19, through circuit closer B, through bar $B^a$, through plug 256, through bar $B^b$, through wire 15, through solenoid $B^c$, and returns through wire 56, wire 16, and wire 17 to the source of electrical energy 11. This energization of the solenoid $B^c$ closes the switch 224 opposite it so that a current passes from the source of electrical energy 20, through wire 21, through wire 22, through wire 23, through switch 224 opposite the solenoid $B^c$, through wire 86, through solenoid L, through wire 82, through solenoid CL, through wire 83 to wire 62 and the remaining portion of this circuit is the same as that described in connection with circuit closers G, F and C. It should also be noted that upon energization of the solenoid B$^c$ the switch 239 is positioned so as to span the contact points 291 thereby allowing the current from the wire 71 to pass through wire 84, switch 239, and wire 87 to the wire 86. The purpose of this current is explained elsewhere.

It is now evident that while a hole is being punched the spacing table and the operating mechanism must at the same time be stopped and the punch press will be in operation. Immediately after the hole is punched the spacing table and the operating mechanism should resume operation, unless the piece of work is completed. For this purpose the automatic switch 257 is suitably attached to the punch press and connected with the rammer 149' so that when the rammer moves upwardly after a hole is punched, a circuit will be closed by the automatic switch 257 so as to allow the current to pass from the source of electrical energy 20, through wire 21, through wire 22, through switch 257, through wire 71. Now if the spacing table is to travel to the right, the current passes through wire 72, through wire 73, through switch 233, through wire 74, through wire 61 and the remaining portion of this circuit is the same as that described in connection with the closing of circuit closer GD. If the spacing table is to travel to the left the current from wire 71 passes through wire 72, switch 233, wire 77, to wire 75 and the remaining portion of this circuit will be the same as that described in connection with the closing of the circuit closer F. If the spacing table is to travel "out," the current from the wire 71 passes through wire 84, wire 85 to wire 80 and the remaining portion of this circuit will be the same as that described in connection with the closing of circuit closer C. If the spacing table is to travel "in," the current from the wire 71 passes through wire 84, switch 239, wire 87, to wire 86 and the remaining portion of this circuit is the same as that described in connection with the closing of circuit closer B.

It will be seen that the circuit that is closed by the automatic switch 257 will operate the means that will cause the spacing table to travel as determined by a previous operation of one or more of the circuit closers G, F, C or B. When regular punching is being done the following switches will be closed: 105$^x$, and 34. The following switches will be open: 154', 105' and 94'. When the repeater is being used the following switches will be closed: 154', 105' and 94' while switches 105$^x$ and 34 will be open. What is meant by regular punching is such punching as cannot be done by the repeater. The currents that are passed through the contacts on the distance determining mechanism DDM are from the source of electrical energy 11, and also from the source of electrical energy 20. The switch 155' is to switch the current from contacts number —— to contacts number —— when it is desired to punch automatically.

When the regular punching is being done the current will be passed from the source of electrical energy 11, through wire 18, through wire 96', through proper contacts on the distance determining mechanism DDM, through wire 97', through switch 105$^x$, through wire 98, through wire 15 from bar I$^b$, through solenoid I$^c$ and returned through the wire 56, and through wire 17 to the source of electrical energy 11. This circuit just described will energize the solenoid I$^c$ and thus the switch 126 opposite it will be closed and a circuit formed as described in connection with circuit closer I. It is to be noted that this is the only circuit that is closed by the distance determining mechanism DDM when regular punching is being done.

When the repeater is being used the spacing table is stopped and the punch press is operated by the following means: The current is passed from the source of electrical energy 11, through wire 18, through wire 96', through the proper contacts on the distance determining mechanism DDM, through wire 97', through switch 105$^x$, through wire 99', through wire 102, through wire 15 leading from bar H$^b$, to the solenoid H$^c$ thereby forming a circuit which has already been described for the purpose of gaging the punch. The current is also passed from the wire 97' through the switch 105$^x$, through wire 99', through wire 101$^x$, through wire 15 leading from bar D$^b$, through solenoid D$^c$ and returning through wire 17 to the source of electrical energy 11. This energization of the solenoid D$^c$ forms the circuits which have already been described and thus it will be seen that while the hole is being punched the distance determining mechanism will be reversed and the repeater will be returning to the combination as set and when that combination is reached the contacts closed the current will be passed from the source of electrical energy 20, through wire 21, through wire 22, through wire 103$^x$, through the proper contacts on the repeating device, through wire 104$^x$, through wire 71, and if switch 133 is set so that the spacing table is to travel to the right, through wire 72, through wire 73, through switch 233, through wire 74, to wire 61 and form the circuit as described in connection with the circuit closer G. If to the left, from wire 71, through wire 72, through switch 233, through wire 77 to wire 75 and the remaining portion of this circuit is the same as that described in connection with the closing of circuit closer F. If to travel out, through wire 84, switch 239, wire 85, to wire 80 and this circuit is the same as that described in connection with the closing of circuit closer C. If to travel in, through wire 84, switch 239, wire 87 to wire 86 and the remaining portion of this circuit will be the same as that described in the closing of circuit closer B. A current is at the same time passed from wire 71 through switch 94', through wire 93", through alternating switch 56, through wires 57 or 58 alternately energizing the solenoids 59 and 60 which are grounded thereby reversing the distance determining mechanism the instant the spacing table is stopped.

When the counter has returned to the starting point and the contacts thereon are in alignment, a current is passed from wire 71 through switch 94', through wire 93' through contacts on counter, through wire 95', through wire 35 to solenoid 36 which is grounded at 37 thereby stopping the repeater when the last hole is punched. It should be noted that the automatic switch 257 is disconnected from the rammer 149' and is inoperative when the repeater is being used, as all circuits are then controlled by the distance determining mechanism.

If it is desired to move the spacing table only and not to disturb the operating device, it is done by throwing out both clutches at the operating device and closing the circuits at the switch board 268. To stop the table, the circuit closer I is closed and the current passes from the source of electrical energy 20, through wire 21, through wire 153ˣ through the circuit closer Iˣ, through wire 84' to wire 51 and the remainder of this circuit is the same as that described in connection with the circuit closer I. To start the table moving in the direction it was moving when stopped, the current is passed from the source of electrical energy 20 through wire 153ˣ, through circuit closer X on the switch board 268, through wire 95', through wire 71, through one or both of the switches 233 or 239 in the manner already described above.

If it is desired to move the table to the right the current is passed from the source of electrical energy 20, through wire 21, through wire 153ˣ, through circuit closer Gˣ, through wire 86ˣ, through wire 61 and the remainder of this circuit is the same as that described in closing the circuit closer G.

If it is desired to move the table to the left the current passes from the source of electrical energy 20, through wire 21, through wire 153ˣ, through circuit closer Fˣ, through wire 82ˣ, through wire 75 and the remaining portion of this circuit is the same as that described in the closing of the circuit closer F.

If it is desired to move the table out the current is passed from the source of electrical energy 20, through wire 21, through wire 153ˣ, through circuit closer Cˣ, through wire 89ˣ, through wire 80 and the remaining portion of this circuit is the same as that described in the closing of the circuit closer C.

If it is desired to move the table in, the current is passed from the source of electrical energy 20, through wire 21, through wire 153ˣ, through the circuit closer Bˣ, through wire 26ˣ to wire 86 and the remaining portion of this circuit is the same as that described in the closing the circuit closer B.

The solenoids L, K, M, L', K', and M' used in connection with the gear and clutch system 74 are situated at the air valve.

In Figure 2 there is disclosed a gusset plate such as is used in structural steel construction. Note that this gusset plate is marked with a shop order number, number of prints from which it is taken, the size of the plate to be used, the number of plates required and the size of the holes to be punched.

To produce this plate in the ordinary shop, the layerout would lay out a template plate. He would then go to the machinist who has the gusset plate sheared and punched and it would then be brought to the marker who would mark the other forty nine plates by clamping the template on each one of the forty nine plates and marking them with the template punch.

With the spacing appliance that I have just described the gusset plate would go directly to the punch press. The punch pressman would receive a spacing bill such as is disclosed in Figure 93. This bill is made out to direct the punch pressman in the punching of a gusset plate as shown in Figure 2. Note that the shop order number is given on the spacing bill with the print number, the size of plate to be used, the number of plates required and the size of the holes required therein. This information would be sufficient for him to proceed with the work.

His operations would be about as follows: He would open the door at the side of the casing 324 shown in Figure 90 and adjust a blank record sheet 100. He would then enter the spacing bill 327 as has previously been described using the knob 326. This operation would be similar to the insertion of a sheet of paper in an ordinary typewriter. One line will appear at a time through the opening 330 as disclosed in Figure 91 and in this way the operator sees only the line on the spacing sheet to be used on that particular space and does not get confused with other lines on the spacing bill. He will now disconnect the current at the record sheet operating device and adjust the plate on the spacing table and is ready to proceed with his work.

He first sets the distance determining mechanism at one inch and then operates the key 210 having its button marked H which punches the first hole in this gusset plate. The numerals on Figure 2 indicate the order in which the holes are punched. After the first hole is punched he operates the key 210 marked G which causes the spacing table to move one inch to the right and stop since a circuit will be closed by the distance determining mechanism DDM (see Figures 1 and 2) whereby the current will pass from the source of electrical energy M through wire 18, through wire 19, through DDM, through wire 18' to wire 15 leading to solenoid I$^c$. The key 210 marked H is again operated and the second hole is punched. While the second hole is being punched he sets the distance determining mechanism at three inches and the automatic switch 257 will come into play so as to cause the spacing table to continue its movement to the right, three inches and stop. The key 210 marked H is again punched thus forming hole number three. This order of operation is carried out until the sixth hole is reached. While the sixth hole is being punched the key 210 marked E is operated which causes the energization of solenoid FG and thus discontinues the movement of the table to the right. The key 210 marked B is simultaneously operated and thus upon completion of the hole number six the spacing table travels "in" and the holes number seven, eight, nine, ten and eleven will be punched in a manner which will be quite evident. While the hole number eleven is being punched the keys F and C are operated, and thus the solenoid C$^c$ will open the switch 224 opposite solenoid B$^c$ and at the same time causing the spacing table to travel "out" five inches. The closing of circuit closer F caused the spacing table to travel to the left five inches. In other words the spacing table is traveling two ways at the same time namely "out" and to the angle of forty five degrees, traveling five inches each way and stop, as the DDM has been set at five inches. The key 210 marked H is now actuated for punching the hole. The DDM is then set for two and one eighth inches and while the cross hole is being punched the circuit closer G is actuated and since the switch opposite solenoid C$^c$ remains closed the spacing table continues to travel "out" but stops traveling to the left and travels to the right. In other words the table travels "out" two and one eighth inches and at the same time to the right two and one eighth inches and as the DDM is set at two and one eighth inches it stops and the key 210 marked H causes the punching of hole 13 and the plate is finished.

It will be understood from all the foregoing that a spacing appliance has been provided which realizes the objects of invention and the advantages herein set forth, together with other objects and advantages.

The invention in its broader aspect is not limited to the mechanism herein shown and described, or to any particular mechanisms, but many changes may be made thereupon without departing from the principles of the invention and without sacrificing its chief advantages.

Having thus described my invention what I claim as new is:—

1. In combination, a spacing table operating mechanism, switches controlling said mechanism, a circuit closing mechanism controlling the switches, a circuit changing device interposed between the switches and the circuit closing mechanism, a distance determining means for controlling the spacing table operating mechanism so as to relatively position the spacing table for widely varying distances relative to a tool equipped means and recording means formed through the circuit closing mechanism.

2. In combination, a circuit closing mechanism, means for operating the circuit closing mechanism, a plurality of switches, means controlled by the circuit closing mechanism for operating the switches, means controlled by the switches for progressing a spacing table relatively to a tool equipped means, and a record device for recording the operation of the circuit closing mechanism.

3. In combination, a circuit closing mechanism, a plurality of switches controllable by said circuit closing mechanism, a spacing table operating mechanism controllable by said switches, means interposed between the circuit closing mechanism and the switches for operating the switches, means for operating the circuit closing mechanism, means for recording the operation of the circuit closing mechanism, means controllable by the circuit closing mechanism for operating the recording means, and a distance determining means controlling the spacing table operating mechanism so as to position a spacing table relatively to a tool equipped means through widely varying distances.

4. In combination, a spacing table operating mechanism, a plurality of switches controlling said spacing table operating mechanism, a circuit closing mechanism, means interposed between the circuit closing mechanism and the switches for operating the switches, a circuit changing mechanism interposed between the last mentioned means and the circuit closing mechanism, means for operating the circuit closers, means for recording the operation of the circuit closing mechanism, means controllable by the circuit closing mechanism for operating the recording means, and distance determining means controlling the spacing table operating mechanism for positioning a spacing table relatively to a tool equipped means through widely varying distances.

5. In combination, a casing, a record operating winding and unwinding mechanism therein, a record sheet therefor, a circuit closing mechanism operable by the record sheet positioned within the casing, a distance determining means and a counting mechanism disposed in the casing.

6. In combination, a circuit closing mechanism, a distance determining mechanism, and adding mechanism cooperating therewith, a spacing table operating mechanism controllable through the circuit closing mechanism and the distance determining mechanism for moving a spacing table relatively to a tool equipped means, and means cooperating with the circuit closing mechanism for forming a record sheet.

7. In combination, a circuit closing mechanism, a distance determining mechanism, an adding mechanism cooperating therewith, a spacing table operating mechanism controllable through the circuit closing mechanism and the distance determining mechanism for moving a spacing table relatively to a tool equipped means.

8. A distance determining mechanism comprising a shaft, a plurality of disks mounted on said shaft, and one of said disks being keyed thereto, means associated with said disks for closing a circuit at a predetermined point in their revolutions, and means controlling the revolutions of the disks in respect to one another.

9. In combination, a spacing table operating mechanism, a distance determining mechanism comprising a shaft, a clutch mechanism situated between the spacing table operating mechanism and the shaft, a plurality of disks mounted on said shaft and one of said disks being keyed thereto, means associated with the disks for stopping the spacing table operating mechanism at a predetermined point in their revolutions, and means controlling the operation of the disks with respect to one another.

10. A spacing table operating mechanism comprising a frame, a drive shaft journalled in the frame, a pair of intermediate shafts journalled in the frame so that the drive shaft will be disposed between them, gears for connecting the intermediate shafts with the drive shaft so as to revolve them in opposite directions from the drive shaft, other gears connecting the intermediate shafts with the drive shaft for turning the intermediate gears in the same direction with the drive shaft, means on the intermediate shafts for controlling the effectiveness of the gears upon the intermediate shafts, a pair of driven shafts in alignment with the intermediate shafts, a clutch interposed between each of the intermediate shafts and its corresponding driven shaft, and a brake on each of said driven shafts.

11. In combination, a shaft, means for driving the shaft in a clockwise direction, means for driving the shaft in a counter-clockwise direction, clutch means disposed between the shaft and the two driving means, said clutches being connected to each other, a piston for operating the clutches, compressed air means for moving the piston, a valve for controlling the compressed air so as to move the piston in either direction, and solenoids for controlling the valves.

12. In combination, a circuit closing mechanism, a circuit changing mechanism for operating therewith, a distance determining mechanism, a spacing table operating mechanism controllable through the circuit closing mechanism and the distance determining mechanism for moving a spacing table relatively to a tool equipped means, a repeating mechanism associated with the distance determining mechanism, and a sounding mechanism associated with the repeating mechanism.

13. In combination, a circuit closing mechanism, a circuit changing mechanism for operating therewith, a distance determining mechanism, a spacing table operating mechanism controllable through the circuit closing mechanism and the distance determining mechanism for moving a spacing table relatively to a tool equipped means, a repeating mechanism associated with the distance determining mechanism, a counting mechanism associated with the repeating mechanism, and means co-operating with the circuit closing mechanism for forming a record sheet.

14. In combination, a spacing table operating mechanism, a circuit closing mechanism, a record device for operating the circuit closing mechanism, a plurality of switches, means controlled by the circuit closing mechanism for operating the switches, a circuit changing device interposed between the circuit closers and said means, and circuits including the switches and passing through the circuit changing device for controlling the spacing table relatively to a tool equipped means.

15. In combination, a spacing table, means for operating the spacing table relatively to a tool equipped means, a distance determining mechanism associated with said means, a repeating mechanism co-operating with the distance determining mechanism, and a totaling mechanism co-operating with the repeating mechanism.

16. In combination, a spacing table, an operating means for said spacing table, a distance determining mechanism associated with the operating means, and a repeating mechanism co-operating with the distance determining mechanism.

17. In combination, a spacing table, electric operating means for said spacing table, a distance determining mechanism, a circuit including the distance determinng mechanism and the operating means, said distance determining mechanism comprising a shaft, means for rotating the shaft manually, a plurality of disks mounted on the shaft, and one of said disks being keyed thereto, means associated with the disk for closing said circuit at a certain ascertained revolution of each disk, a plurality of gears controlling the movement of the disks with respect to one another, and means for setting the disks at a desired point.

18. In combination, a spacing table, means for operating the spacing table, a space counting mechanism, a repeating mechanism, and a totaling mechanism associated therewith.

19. A spacing table operating mechanism including a frame a drive shaft mounted centrally of the frame, a pair of intermediate shafts disposed one on each side of the drive shaft, a pair of driven shafts for the spacing table, one on each side of the drive shaft and one in alignment with each of the intermediate shafts, clutch mechanisms disposed between the drive shafts and the intermediate shafts, and clutch mechanisms disposed between the intermediate shafts and the driven shaft.

20. An operating device for a spacing table including a frame, a drive shaft, a pair of driven shafts, a pair of intermediate shafts, clutches disposed between the intermediate shafts and the driven shafts, and clutches disposed between the driven shafts and the intermediate shafts.

21. An operating device for a spacing table including a frame, a drive shaft, a pair of driven shafts, a pair of intermediate shafts, clutches disposed between the intermediate shafts and the driven shaft, and a reversing mechanism associated with the drive shaft and the intermediate shafts.

22. An operating device for a spacing table including a frame, a drive shaft, a pair of driven shafts, a pair of intermediate shafts, clutches disposed between the intermediate shafts and the driven shafts, clutches disposed between the drive shaft and the intermediate shafts, and a brake mechanism associated with each of the driven shafts.

23. An operating mechanism for a spacing table including a drive shaft, a driven shaft, an intermediate shaft, a clutch mechanism associated with the driven shaft and the intermediate shaft, a combination clutch and reversing mechanism associated with the drive shaft and the intermediate shaft, means for normally holding both clutch members normally in an inoperative position, and means for operating the clutch mechanism and the combined clutch and reversing mechanism.

24. In combination, a shaft, a sleeve slidable on the shaft, means for keying the sleeve to the shaft, a pair of male clutch elements situated one on each end of the sleeve, a combined gear and female clutch element associated with one male clutch element, a fixed female clutch element associated with the other male clutch element, springs for normally holding the male clutch element in inoperative position, a piston on said sleeve, a cylinder for said piston, a cylinder head having a pair of passages therein spaced from each other, a compressed air line and a valve associated therewith for leading the compressed air in the line to one of the passages for the purpose of shifting the piston in the manner and for the purpose specified.

25. In combination an operating device for a spacing table, a compressed air mechanism for controlling the operating device, a valve in the compressed air mechanism for control thereof including a plate having teeth on its ends, a pair of spaced pins on the plate, a pair of racks each engageable with the teeth on one end of the plate, a rod having a bifurcated end engageable with the pins on the plate, three cylinders for receiving the racks and the bar, a valve associated with each cylinder, a compressed air line connected with the cylinders through the last mentioned valves, and electrically operated means for controlling the last mentioned valves for operation of the first mentioned valves in the manner and for the purpose specified.

26. An operating device for a spacing table including in combination, a frame, a drive shaft journaled in the frame, a pair of gears mounted in spaced relation to each other on the drive shaft, a pair of driven shafts, a pair of intermediate shafts, a pair of combined gear and clutch members mounted in spaced relation on the intermediate shaft, one of said combined gear and clutch members being keyed thereto, both of said combined gear and clutch members on the intermediate shafts being rotatable independently thereof, a pair of idler gears disposed between one of the gears on the drive shaft and one of the combined clutch and gear members on the intermediate shafts, the other gear on the drive shaft meshing with the other combined gear and clutch members on the intermediate shafts, a pair of sleeves, one on each intermediate shaft, a clutch element at each end of each sleeve, and compressed air means for shifting the sleeve, said sleeves being keyed to the intermediate shafts, a clutch mechanism disposed between each intermediate shaft and each driven shaft, and means for operation thereof.

In testimony whereof I affix my signature in presence of two witnesses.

ALBERT A. FAUST.

Witnesses:
CLAUD F. WITTY,
SAMUEL EDWARD HARRELL.